United States Patent
Won et al.

(10) Patent No.: US 11,149,959 B2
(45) Date of Patent: Oct. 19, 2021

(54) COOKING APPARATUS AND METHOD FOR CONTROLLING COOKING APPARATUS

(71) Applicant: Samsung Electronics Co., Ltd., Suwon-si (KR)

(72) Inventors: Tae Yeon Won, Incheon (KR); Ji Young Lee, Yongin-si (KR); Sang Jin Jeong, Yongin-si (KR); Kyoung Hoon Ko, Gwangmyeong-si (KR); Seo Eun Yun, Seoul (KR); Joo Young Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 15/760,588

(22) PCT Filed: Sep. 7, 2016

(86) PCT No.: PCT/KR2016/010031
§ 371 (c)(1),
(2) Date: Mar. 15, 2018

(87) PCT Pub. No.: WO2017/047972
PCT Pub. Date: Mar. 23, 2017

(65) Prior Publication Data
US 2018/0259194 A1    Sep. 13, 2018

(30) Foreign Application Priority Data
Sep. 15, 2015  (KR) .......................... 10-2015-0130428

(51) Int. Cl.
*F24C 15/18* (2006.01)
*F24C 7/06* (2006.01)
(Continued)

(52) U.S. Cl.
CPC .............. *F24C 15/18* (2013.01); *A23L 27/27* (2016.08); *F24C 7/06* (2013.01); *F24C 7/087* (2013.01)

(58) Field of Classification Search
CPC ............. F24C 7/06; F24C 7/087; F24C 15/18
(Continued)

(56) References Cited

U.S. PATENT DOCUMENTS

2003/0015518 A1* 1/2003 Baker ..................... F24C 7/087
                                                          219/486
2008/0066629 A1    3/2008 Bartelick et al.
(Continued)

FOREIGN PATENT DOCUMENTS

KR  10-2010-0110559 A   10/2010
KR     10-1425896 B1     8/2014
(Continued)

OTHER PUBLICATIONS

ISA/KR, International Search Report and Written Opinion of the International Searching Authority, International Application No. PCT/KR2016/010031, dated Dec. 22, 2016, 13 pages.
(Continued)

*Primary Examiner* — Steven B McAllister
*Assistant Examiner* — Benjamin W Johnson

(57) ABSTRACT

Provided is a cooking apparatus and method of controlling the cooking apparatus. The cooking apparatus includes a cooking chamber; a heating portion installed in the cooking chamber; and a smoking agent accommodation portion separably mounted on the heating portion and capable of accommodating a smoking agent.

8 Claims, 20 Drawing Sheets

(51) Int. Cl.
    *A23L 27/27* (2016.01)
    *F24C 7/08* (2006.01)
(58) Field of Classification Search
    USPC .............................................. 126/4
    See application file for complete search history.

(56) References Cited

U.S. PATENT DOCUMENTS

2008/0121632 A1  5/2008  Wang
2010/0247721 A1  9/2010  McGhee, Jr. et al.

FOREIGN PATENT DOCUMENTS

| KR | 10-1530048 B1 | 6/2015 |
| WO | 2013164199 A1 | 11/2013 |
| WO | 2014051206 A1 | 4/2014 |
| WO | 2014095659 A1 | 6/2014 |

OTHER PUBLICATIONS

European Patent Office, "Communication pursuant to Article 94(3) EPC," Application No. EP16846793.4, dated Aug. 1, 2019, 8 pages.
European Patent Office, Supplementary European Patent Search Report for Application No. EP 16846793.4, dated Aug. 21, 2018, 8 pages.
Communication pursuant to Article 94(3) EPC dated Apr. 17, 2020 in connection with European Patent Application No. 16 846 793.4, 6 pages.
Notification of Reason for Refusal in connection with Korean Application No. 10-2015-0130428 dated Aug. 27, 2021, 11 pages.

\* cited by examiner

COOKING APPARATUS AND METHOD FOR CONTROLLING COOKING APPARATUS

CROSS REFERENCE TO RELATED APPLICATIONS

The present application claims priority under 35 U.S.C. § 365 and is a 371 National Stage of International Application No. PCT/KR2016/010031 filed Sep. 7, 2016, which claims the benefit of Korean Patent Application No. KR 10-2015-0130428 filed Sep. 15, 2015, the disclosures of which are fully incorporated herein by reference into the present disclosure as if fully set forth herein.

TECHNICAL FIELD

A cooking apparatus is an apparatus which heats and cooks a foodstuff such as food and refers to, for example, an oven, a microwave heating apparatus (a microwave oven), a gas stove, an electric range, or the like.

Among them, an oven includes a cooking chamber and a heating apparatus which heats an inside of the cooking chamber. The oven is a cooking apparatus in which foodstuff is inserted into the cooking chamber, the cooking chamber is closed, and the foodstuff is cooked by applying heat to the foodstuff, and may perform a variety of functions including roasting, deep-frying, steaming, and defrosting the foodstuff.

The oven may generate heat for heating food using electricity or generate heat for heating food by burning gases to generate heat inside the cooking chamber such that the foodstuff inserted into the cooking chamber is cooked by the generated heat. In this case, a circulation fan for forcibly circulating the generated heat may be provided in the oven. Also, the oven may emit infrared rays toward the foodstuff in the cooking chamber so that the foodstuff becomes cooked.

SUMMARY

The present invention is directed to providing a cooking apparatus capable of adequately smoking a foodstuff and also of optimally smoking the foodstuff according to a type of the foodstuff through the easy adjustment of an amount of smoke generated, and a method of controlling the cooking apparatus.

The present invention is also directed to providing a cooking apparatus capable of further smoking a foodstuff according to a user's intention and a method of controlling the cooking apparatus.

The present invention is also directed to providing a cooking apparatus in which a container which accommodates a smoking agent during cooking may be easily separated or mounted and to providing a method of controlling the cooking apparatus.

One aspect of the present invention provides a cooking apparatus includes a cooking chamber; a heating portion installed in the cooking chamber; and a smoking agent accommodation portion separably mounted on the heating portion and capable of accommodating a smoking agent.

The heating portion comprises a mounting portion on which the smoking agent accommodation portion is mounted and which generates and transmits heat to the smoking agent accommodation portion, and the mounting portion comprises a smoking agent accommodation portion coupling portion provided in front of the heating portion to allow the smoking agent accommodation portion to be mountable.

The smoking agent accommodation portion comprises a body portion which accommodates the smoking agent and a heating portion coupling portion formed on an outer surface of the body portion and configured to be mountable on or separable from the smoking agent accommodation portion coupling portion.

The heating portion coupling portion comprises a first guide member formed at the outer surface of the body portion to protrude, a second guide member formed at the outer surface to protrude and spaced a certain distance apart from the first guide member, and a mounting groove formed between the first guide member and the second guide member and coupled to the smoking agent accommodation portion coupling portion.

The heating portion comprises a first heating portion which provides heat to an inside of the cooking chamber and a second heating portion which provides heat to the smoking agent accommodation portion.

The the first heating portion commences operation according to predefined settings, and after a certain period of time elapses, the second heating portion commences operation.

A temperature of the second heating portion is adjusted to be lower than a temperature inside the cooking chamber adjusted by the first heating portion or is adjusted to be higher than the temperature inside the cooking chamber. When the temperature of the second heating portion is adjusted to be lower than the temperature inside the cooking chamber, the second heating portion operates for a first smoking operation period, and when the temperature of the second heating portion is adjusted to be higher than the temperature inside the cooking chamber, the second heating portion operates for a second smoking operation period shorter than the first smoking operation period.

The first heating portion and the second heating portion complete operation at the same time or the first heating portion completes operation after the second heating portion completes operation.

When a smoking commencement command is input according to operation by a user, the second heating portion begins providing heat to the smoking agent accommodation portion.

When the first heating portion and the second heating portion operate at the same time, the first heating portion provides an amount of heat smaller than an amount of heat provided to the inside of the cooking chamber when only the first heating portion operates.

Another aspect of the present invention provides a method of controlling a cooking apparatus, includes: installing a smoking agent accommodation portion which accommodates a smoking agent; operating a plurality of heating portions, according to predefined settings or operation by a user; and performing a smoking function by providing, by one or more of the plurality of heating portion, heat to the smoking agent accommodation portion.

Each of the plurality of heating portions comprises a first heating portion which provides heat to an inside of the cooking chamber and a second heating portion which provides heat to the smoking agent accommodation portion.

The providing, by one or more of the plurality of heating portions, of heat to the smoking agent accommodation portion according to the predefined settings or operation by the user comprises one or more of: the second heating portion operating for a first smoking operation period when a temperature of the second heating portion is adjusted to be lower than a temperature inside the cooking chamber; and the second heating portion operating for a second smoking operation period shorter than the first smoking operation period when the temperature of the second heating portion is adjusted to be higher than the temperature inside the cooking chamber.

When the first heating portion and the second heating portion complete operations, the first heating portion and the second heating portion perform one or more of: completing, by the first heating portion and the second heating portion, operation at the same time or completing, by the first heating portion, operation after the second heating portion completes operation; and completing, by the second heating portion, operation and commencing, by the second heating portion, operation according to operation by the user.

When the first heating portion and the second heating portion operate at the same time, providing, by the first heating portion, an amount of heat smaller than an amount of heat provided to the inside of the cooking chamber when only the first heating portion operates.

Advantageous Effects

According to the above-described cooking apparatus and method of controlling the cooking apparatus, a foodstuff is more properly smoked such that the foodstuff may be cooked with a flavor added thereto.

According to the above-described cooking apparatus and method of controlling the cooking apparatus, a foodstuff may be optimally smoked according to a type of the foodstuff through the easy adjustment of an amount of smoke generated.

According to the above-described cooking apparatus and method of controlling the cooking apparatus, a foodstuff may be further smoked according to a user's intention by adjusting an amount of smoke generated according to operation by a user.

According to the above-described cooking apparatus and method of controlling the cooking apparatus, a container which accommodates a smoking agent may be easily separated and mounted during cooking such that user convenience and safety may be improved. According to the above-described cooking apparatus and method of controlling the cooking apparatus, it is possible to minimize occurrence of harmful substances caused by the heating of a smoking agent.

DETAILED DESCRIPTION

Hereinafter, one embodiment of a cooking apparatus will be described with reference to FIGS. 1a to 8.

Figure 1A:
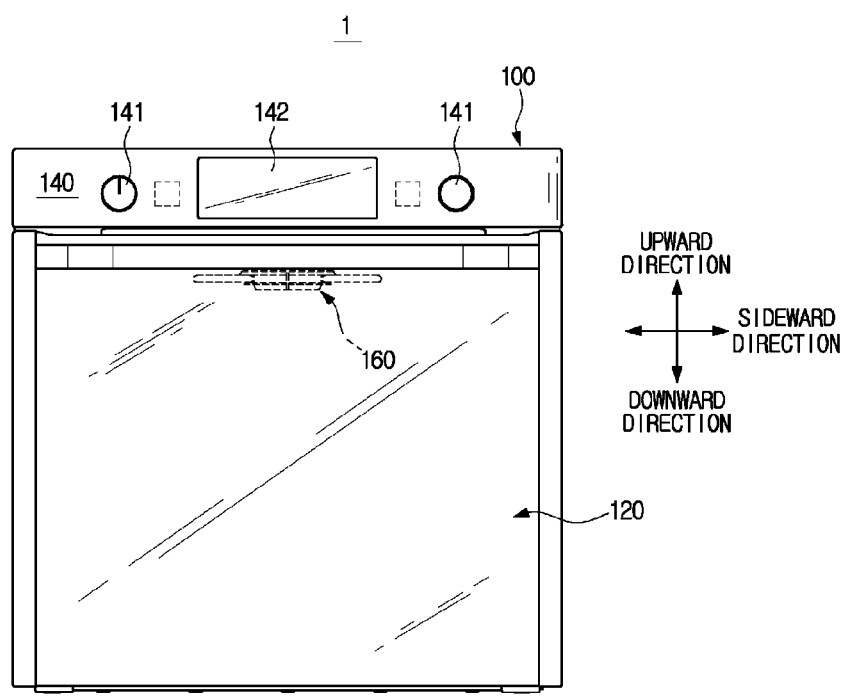
FIG. 1a is a front view illustrating one embodiment of a cooking apparatus.
Figure 1B:
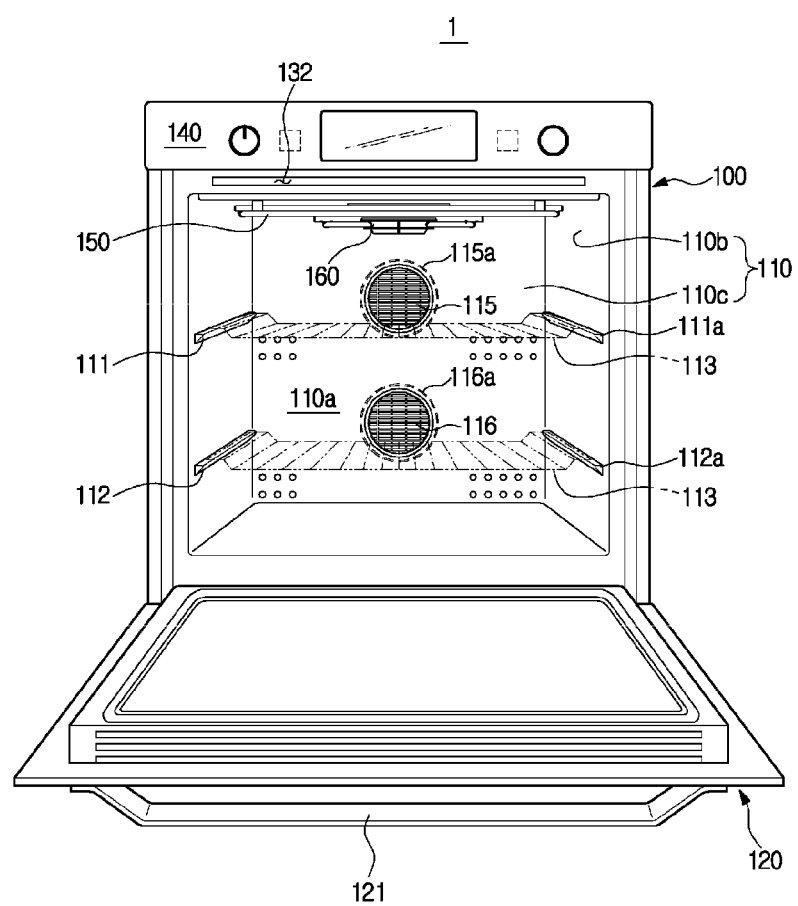
FIG. 1b is a view illustrating an open door state with respect to the one embodiment of the cooking apparatus.
Figure 2:
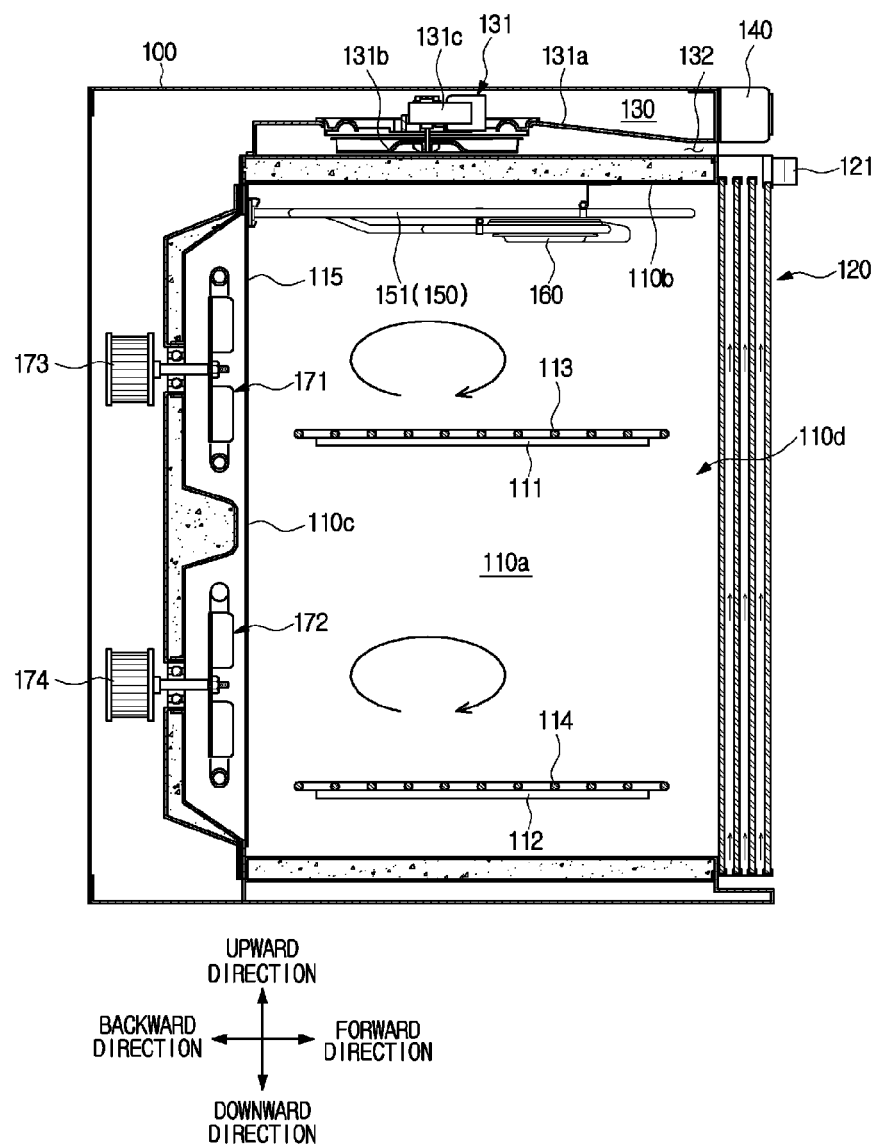
FIG. 2 is a side cross-sectional view illustrating one example of the cooking apparatus.

FIG. 1a is a front view illustrating one embodiment of a cooking apparatus, and FIG. 1b is a view illustrating an open door state with respect to the one embodiment of the cooking apparatus. FIG. 2 is a side cross-sectional view illustrating one example of the cooking apparatus.

Hereinafter, for convenience of description, a direction toward which a door 120 is formed in a cooking apparatus 1 is referred to as a forward direction and a direction opposite to the forward direction is referred to as a backward direction. Also, when the cooking apparatus 1 is normally installed, a direction toward the ground is referred to as a downward direction and a direction opposite to the downward direction is referred to as an upward direction. In addition, a segment of a line perpendicular to a segment of a line which connects the forward direction to the backward direction is referred to as a lateral direction.

Referring to FIGS. 1a to 3, the cooking apparatus 1 may include a body 100 which forms an exterior, a cooking chamber 110 which is provided in the body 100 and includes an opening at one surface, the door 120 which opens and closes the opening of the cooking chamber 110, an electronic device chamber 130 in which a variety of components related to a cooking operation are built, and a user interface 140 installed outside the body 100.

The cooking chamber 110 includes internal panels 110b formed on a top surface, a bottom surface, and both side surfaces of the cooking chamber 110 and a rear surface panel 110c connected to the internal panels 110b toward a rear surface of the cooking chamber 110. A cooking space 110a is formed inside the cooking chamber 110 by the internal panels 110b and the rear surface panel 110c. The internal panels 110b may be formed by combining a plurality of panels provided at the top surface, the bottom surface, and the both side surfaces of the cooking chamber 110 or may be formed as a whole to include the top surface, the bottom surface, and the both side surfaces of the cooking chamber 110.

One or more supports 111, 111a, 112, and 112a may be formed on a left side surface and a right side surface of the internal panels 110b to protrude toward the cooking space 110a. In this case, any one of the supports 111 and 112 formed on the left side surface may be provided to correspond to any one of the supports 111a and 112a formed on the right side surface to form a pair. D1 may be formed on each of the left side surface and the right side surface of the internal panels 110b to allow the corresponding supports 111 and 111a or 112 and 112a to be arranged at the same height.

A tray 113 or 114 on which a foodstuff is mountable may be provided to be mountable on at least one pair of corresponding supports 111 and 111a or 112 and 112a. In this case, the tray 113 or 114 may be seated on a top surface of the corresponding supports 111 and 111a or 112 and 112a to be mounted on the corresponding supports 111 and 111a or 112 and 112a. The supports 111 and 112 arranged on the same side surface may be arranged upward and downward such that a plurality of trays 113 and 114 may be arranged in the cooking space 110a.

The cooking space 110a of the cooking chamber 110 may be divided into a plurality of sections by a first tray 113 located in an upper portion thereof. In other words, the first tray 113 may be mounted on first supports 111 and 111a horizontally arranged in the cooking chamber 110 to divide the cooking chamber 110 into a first cooking space on top and a second cooking space on bottom. The first tray 113 may be formed of an insulating material according to an embodiment such that the first cooking space and the second cooking space may be insulated from each other.

One or more outlets 115 and 116 through which air inside the cooking space 110a moves and inlets 115a and 116a provided corresponding to the one or more outlets 115 and 116 may be formed at the rear surface panel 110c of the cooking chamber 110. When a plurality of such outlets 115 and 116 and a plurality of such inlets 115a and 116a are provided, one outlet 115 and inlet 115a may be provided to be exposed to the first cooking space, and the other outlet 116 and inlet 116a may be provided to be exposed to the second cooking space. One or more fans 171 and 172 and one or more motors 173 and 174 for rotating the one or more fans 171 and 172 are provided in the rear of the outlets 115 and 116. When the fans 171 and 172 rotate according to the driving of the first motors 173 and 174, the air in the cooking space 110a flows through the inlets 115a and 116a and is discharged into the cooking space 110a according to rotations of the fans 171 and 172 such that the air in the cooking space 110a circulates. The outlets 115 and 116 and the inlets 115a and 116a may be formed at the side surface panels 110b of the cooking chamber 110.

An opening 110d through which a foodstuff is insertable into or withdrawable from the cooking space 110a may be formed at a front of the cooking chamber 110. The opening 110d is provided to be openable and closeable by the door 120 provided at the body 100.

The door 120 may be provided to be movable upward and downward or leftward and rightward with respect to the cooking chamber 110. In this case, the door 120 may be slidably coupled with the body 100. Also, the door 120 may be provided to be pivotable on a leftward and rightward shaft or an upward and downward shaft. In this case, the door 120 may be hinge-coupled with the body 100. A part of the door 120 may be formed of a transparent material such as glass and the like to allow a user to see a food cooking process inside the cooking chamber 110 from the outside. The door 120 may further include a handle 121 gripped by the user such that the user may easily open and close the door 120 by using the handle. The handle 121 may be formed to protrude toward the front of the door 120 or may be formed to retreat toward the inside of the door 120.

The electronic device chamber 130 may be formed near the cooking chamber 110 and may be located, for example, toward an upward direction, a downward direction, or a rearward direction of the cooking chamber 110. In the electronic device chamber 130, a variety of electronic device components (not shown) such as a semiconductor chip, a circuit board, and the like which function as a controller 143 may be arranged, and a cooling portion 131 for lowering a temperature inside the cooking chamber 110 may be also disposed.

The cooling portion 131 suctions outside air into the electronic device chamber 130 and discharges the air outward through a discharge hole 132 formed at the body 100. The cooling portion 131 may include an air discharge duct 131a which forms a flow path of air to discharge the suctioned air in front of the body, a cooling fan 131b which suctions air in the electronic device chamber 130 and discharges the air toward the front of the body 100, and a second motor 131c for driving the cooling fan.

An insulation for preventing heat of the cooking chamber 110 from being transferred to the electronic device chamber 130 may be further installed between the cooking chamber 110 and the electronic device chamber 130.

Figure 3:
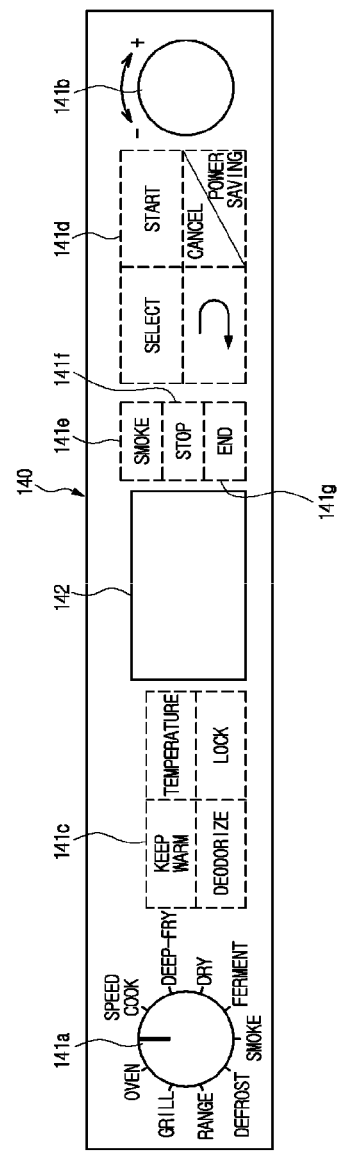
FIG. 3 is a view illustrating one embodiment of the user interface provided at the cooking apparatus.

FIG. 3 is a view illustrating one embodiment of the user interface provided at the cooking apparatus.

The user interface 140 is installed on a front surface of the body 100 and may receive a variety of commands related to controlling the cooking apparatus 1 from the user or may provide a variety of pieces of information related to an operation or state of the cooking apparatus 1 to the user.

As shown in FIG. 3, the user interface 140 may include an input device 141 which receives a variety of settings related to the operation of the cooking apparatus or a user command and include a display 142 which displays information related to the operation of the cooking apparatus. The input device 141 and the display 142 may be formed to be exposed outward.

The input device 141 may receive the variety of settings related to the operation of the cooking apparatus or the user command. Here, the variety of settings related to the operation of the cooking apparatus may include a mode to be performed by the cooking apparatus 1, a cooking temperature, a cooking beginning time, a cooking time, a type or amount of a foodstuff, a smoking beginning time, a smoking operation period, a smoking completion time, a smoking target temperature, and the like. Also, the user command may include at least one of a command related to whether cooked food is kept warm, a command related to whether a cooking temperature is manually selected, a command related to deodorization, a command related to performing a locking function, a command related to beginning smoking, a command related to stopping smoking, and a smoking completion command.

The above-described input device 141 may be embodied using a physical button, a touch sensor, a dial operation device, a stick type operation device, a touch screen, or the like. In addition, the input device 141 may be embodied using a variety of input means capable of receiving a command from a user.

According to one embodiment, the input device 141 may include a first input device 141a which receives a command for selecting a mode to be performed by the cooking apparatus 1. The mode to be performed by the cooking apparatus 1 refers to operation by the cooking apparatus 1, previously programmed and defined. In one mode, a target temperature of the cooking space 110a, a cooking time, an order of a plurality of operations, or the like is defined. The mode to be performed by the cooking apparatus 1 may include, for example, modes defined by a variety of operations executable by the cooking apparatus 1, such as an oven mode, a grill mode, a range mode, a defrosting mode, a smart cooking mode, a deep-frying mode, a drying mode, a fermentation mode, a smoking mode, and the like. When the smoking mode is selected, the cooking apparatus 1 automatically begins heating a smoking agent accommodation portion 160 provided in the cooking space 110a at a certain time and burns the smoking agent for a certain period of time to smoke a foodstuff.

Also, the input device 141 may further include a second input device 141b capable of receiving a command related to adjusting a cooking temperature, a cooking commencement time, a cooking time, a type or amount of a foodstuff, a smoking commencement time, a smoking operation period, a smoking completion time, a smoking target temperature, and/or the like. Here, the amount of the foodstuff may include a weight of the foodstuff. The smoking commencement time means a time when smoking commences, and the smoking completion time means a time when smoking is completed. The smoking operation period means a period during which smoking is performed and may be obtained by a difference between the smoking completion time and the smoking commencement time. When a mode is selected through the first input device 141a or a smoking commencement command is input through a fifth input device 141e, a user may allow cooking or smoking to be performed according to an intention of the user by adjusting the above-described variety of parameters through the second input device 141b.

also, the input device 141 may further include a third input device 141c which receives commands related to whether cooked foodstuff is kept warm, whether a cooking temperature is manually selected, deodorization, and locking, and may include a fourth input device 141d which receives a command for selecting information input by the user and receives a command for beginning cooking, canceling, temporarily stopping, power saving, and returning to an operation previous to the currently set operation.

Also, the input device 141 may further include the fifth input device 141e which receives a smoking commencement command according to operation by the user, a sixth input device 141f which receives a command for temporarily stopping a smoking operation, and a seventh input device 141g which receives a command for canceling and finishing smoking.

The fifth input device 141e may receive a command for commencing a smoking operation of the user when a smoking mode is not selected, when the smoking mode is selected, performed, and then finished, or when the user wants to additionally perform a smoking operation. The sixth input device 141f may temporarily stop the smoking operation when the smoking operation is performed according to the selection of the smoking mode or the smoking operation is performed according to operation by the fifth input device 141e. In this case, the cooking apparatus 1 may remain in a standby state to resume the smoking operation. The seventh input device 141g may completely finish the smoking operation when the smoking operation is performed according to the selection of the smoking mode or the smoking operation is performed according to operation by the fifth input device 141e.

The above-described types, shapes, and positions of the input devices 141a to 141g or types of commands capable of being received by the input devices 141a to 141d may be randomly determined by choice of a designer.

The input device 141 may output an electrical signal corresponding to operation by the user, and the output electrical signal may be transmitted to the controller 143. The controller 143 generates a corresponding control signal according to the electrical signal and then transmits the generated control signal to each component to control the cooking apparatus 1.

The display 142 may display a command input to the input device 141 to be visible to the user or may display a variety of pieces of information related to the cooking apparatus 1 such as cooking process information of the cooking apparatus 1, an operation state of the cooking apparatus 1, or the like. For example, the display 142 may display a variety of pieces of information related to cooking such as a cooking mode selected by the user, information related to a foodstuff such as an amount of food, an expected cooking time, an elapsed cooking time, an expected cooking completion time, a target cooking temperature, a present temperature, or the like.

Also, the display 142 may display information useful to the user, for example, a variety of pieces of guidance information related to cooking a foodstuff, a current time, or the like.

Also, the display 142 may display a variety of pieces of information related to the smoking operation. For example, the display 142 may display a variety of pieces of guide information related to an amount of a smoking agent expected to be necessary for performing the smoking operation, a smoking operation commencement time, a smoking operation completion time, or a smoking operation during the cooking of a foodstuff. Here, the amount of the smoking agent expected to be necessary may be data obtained on the basis of a foodstuff amount, and the data may be empirically obtained or may be obtained by theoretical calculation. The guidance information related to the smoking operation may include a message stating the smoking operation is commenceable by manually operating the fifth input device 141e when a foodstuff is being cooked in a state in which the smoking mode has not been selected. Also, when the fifth input device 141e is operated to commence the smoking operation, the display 142 may display guidance information related to over-cooking food. Over-cooking refers to further cooking food such that quality is decreased.

The display 142, for example, may be embodied using a light emitting lamp or a display. Here, the light emitting lamp may be embodied using a variety of light emitting means such as an incandescent lamp, a fluorescent lamp, a light emitting diode (LED), and the like. Also, the display may be embodied using a liquid crystal display (LCD) panel, a plasma display panel (PDP), an LED display panel, an organic LED (OLED) display panel, or the like.

According to an embodiment, the user interface 140 may further include a sound output portion (not shown). The sound output portion may output sounds corresponding to a variety of situations such as beginning cooking, cooking cancellation, cooking completion, smoking operation commencement, smoking operation completion, error occurrence, and the like. The sound output by the sound output portion may include a voice, a beep sound, music, and the like.

The cooking apparatus 1 may further include a cooking portion 150 for cooking a foodstuff and a smoking agent accommodation portion 160 for smoking a foodstuff.

Figure 4:
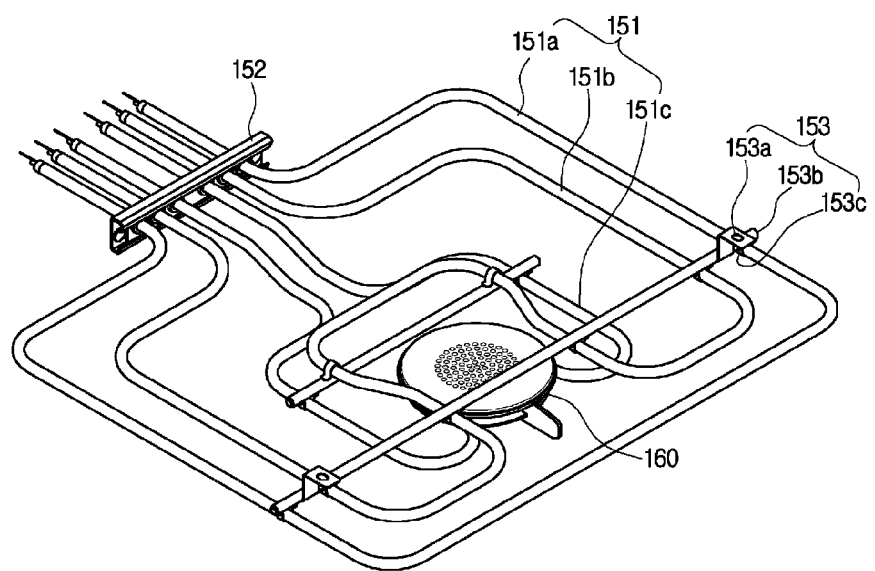
FIG. 4 is a view illustrating one embodiment of the cooking portion and a smoking portion.
Figure 5:
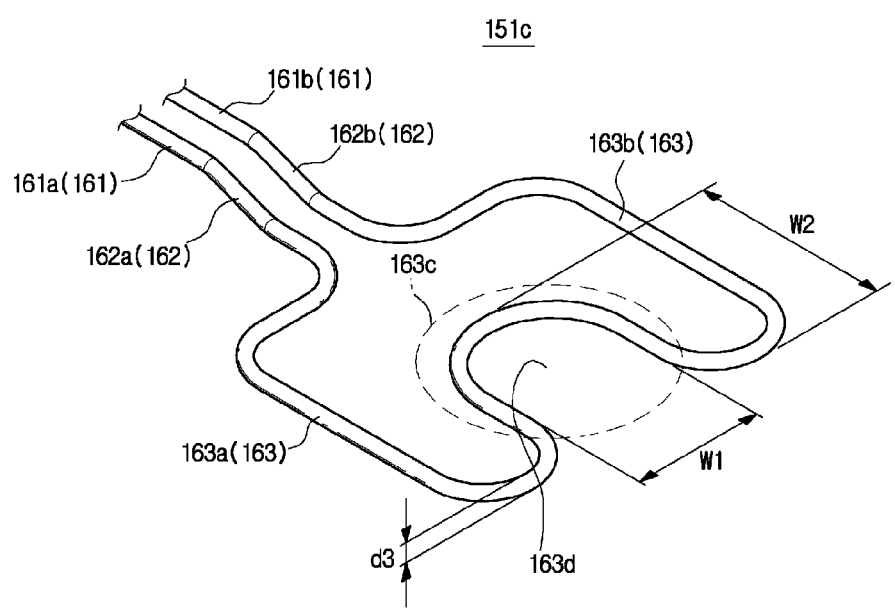
FIG. 5 is a view illustrating one embodiment of a third heater in which the smoking agent accommodation portion is mounted.

FIG. 4 is a view illustrating one embodiment of the cooking portion and a smoking portion, and FIG. 5 is a view illustrating one embodiment of a third heater in which the smoking agent accommodation portion is mounted.

As shown in FIGS. 1b and 2, in one embodiment, the cooking portion 150 is disposed to be adjacent to a top surface of the cooking chamber 110 and is configured to generate heat to provide heat necessary for cooking to the cooking space 110a formed in the cooking chamber 110. In this case, the cooking portion 150 is disposed to be spaced a certain distance apart from the top surface of the cooking chamber 110. According to an embodiment, the cooking portion 150 may be disposed to be adjacent to a bottom surface or a side surface of the cooking chamber 110. Also, as necessary, a plurality of such cooking portions 150 may be provided in one cooking apparatus 1. In this case, the cooking portions 150 may be installed in different positions in the cooking chamber 110.

The cooking portion 150, as shown in FIG. 4, may include a heating portion 151, a spacing member 152, and a coupling member 153.

The heating portion 151 is heated according to applied power to generate heat and provides the heat to the cooking space 110a to cook a foodstuff disposed in the cooking space 110a or applies the heat to the smoking agent accommodation portion 160 to smoke a foodstuff. For this, the heating portion 151 may include a first heating portion which provides heat necessary for cooking a foodstuff and a second heating portion which provides heat necessary for the smoking agent accommodation portion 160.

The heating portion 151 may include one or more heaters 151a, 151b, and 151c which generate heat when a current is applied, and for example, may include a plurality of heaters, that is, first to third heaters 151a, 151b, and 151c as shown in FIG. 4. One or more of the first to third heaters 151a, 151b, and 151c, for example, the first and second heaters 151a and 151b, may be configured to function as the first heating portion which provides heat necessary for cooking a foodstuff, and at least one other heat, for example, the third heater 151c, may be configured to perform a function of the second heater which provides heat necessary for the smoking agent accommodation portion 160.

The first to third heaters 151a, 151b, and 151c may be embodied using hot wires having certain diameters. In this case, the hot wires which embody the first to third heaters 151a, 151b, and 151c may have a variety of shapes according to positions thereof.

The first heater 151a of the heating portion 151 may be disposed to be adjacent to the top surface of the cooking chamber and may be embodied in a shape corresponding to the top surface of the internal panel 110b. According to one embodiment, the first heater 151a may have a certain shape corresponding to a shape of the top surface of the internal panel 110b, for example, a quadrangular shape, and additionally has a certain shape to provide a space in which the second heater 151b and the third heater 151c are installable, for example, a quadrangular shape. The shape of the first heater 151a may be embodied by bending a hot wire, which embodies the first heater 151a, in a quadrangular shape.

The second heater 151b of the heating portion 151 may be disposed to be spaced at certain distances apart from the first heater 151a and the third heater 151c. The second heater 151b may have a variety of shapes according to a choice of a designer. For example, the second heater 151b may have a quadrangular shape corresponding to the shape of the first heater or may have a quadrangular shape partially depressed inward as shown in FIG. 4. Like the first heater 151a, the shape of the second heater 151b may be embodied by bending a hot wire which embodies the second heater 151b.

The first heater 151a of the heating portion 151 is configured to heat approximately sides of the cooking chamber, and the second heater 151b is configured to approximately heat a center of the cooking chamber. When the heating portion 151 includes the plurality of heaters 151a and 151b as described above, a similar amount of heat may be provided to each unit area of the cooking chamber 110.

The first heater 151a and the second heater 151b may be configured to generate the same amount of heat or different amounts of heat when currents of the same levels are applied.

The first heater 151a and the second heater 151b may independently operate or dependently operate. Accordingly, any one of the first heater 151a and the second heater 151b may be heated or may generate a relatively larger amount of heat than that of the other heater.

The third heater 151c of the heating portion 151 may apply heat to the smoking agent accommodation portion 160 to allow the smoking agent accommodation portion 160 to generate smoke. Also, the third heater 151c my transmit heat to an inside of the cooking space 110a.

The third heater 151c of the heating portion 151 may be installed at certain distances apart from the first heater 151a and the second heater 151b by the spacing member 152, may pass through the spacing member 152, and may extend from the electronic device chamber 130 to the cooking chamber 110.

Referring to FIG. 5, the third heater 151c may include a fixing portion 161, an inclined portion 162 inclined by a certain angle toward a bottom surface of the cooking chamber 110, and a mounting portion 163 which extends from the inclined portion 162 toward a front surface of the cooking chamber and on which the smoking agent accommodation portion 160 is mounted.

The fixing portion 161 may include a first fixing portion 161a and a second fixing portion 161b disposed to be spaced a certain distance apart from each other in parallel. One ends of the first fixing portion 161a and the second fixing portion 161b are electrically connected to an electronic component (not shown) of the electronic device chamber 130, and the other ends thereof are configured to extend into the cooking chamber 110.

The inclined portion 162 may include a first inclined portion 162a and a second inclined portion 162b disposed to be spaced a certain distance apart from each other in parallel. One end of the first inclined portion 162a is formed to extend from the other end of the first fixing portion 161a, and the other end of the first inclined portion 162a is configured to be inclined toward a bottom of the cooking chamber 110. Accordingly, the first inclined portion 162a is tilted by a certain angle with respect to the first fixing portion 161a. Likewise, the second inclined portion 162b is configured to include one end connected to the other end of the second fixing portion 161b, and the other end of the second inclined portion 162b is configured to be inclined toward the bottom of the cooking chamber 110. Accordingly, the second inclined portion 162b is tilted by a certain angle with respect to the second fixing portion 161b. The first inclined portion 162a and the second inclined portion 162b are tilted by the certain angles with respect to the first fixing portion 161a and the second fixing portion 161b, respectively, as described above, such that the mounting portion 163 of the third heater 151c may be disposed at a certain distance from the top surface of the cooking chamber and may be located below the other heaters 151a and 151b.

The mounting portion 163 may include a first mounting portion 163a connected to the first inclined portion 162a and a second mounting portion 163b connected to the second inclined portion 162b. The first mounting portion 163a and the second mounting portion 163b may be configured to be curved at a center thereof in different directions such that a distance therebetween may be increased.

The mounting portion 163 may further include a smoking agent accommodation portion coupling portion 163c disposed between the first mounting portion 163a and the second mounting portion 163b and on which the smoking agent accommodation portion 160 is directly connected and mounted. The smoking agent accommodation portion coupling portion 163c is a part at which both ends of the first mounting portion 163a and the second mounting portion 163b extend and are connected to each other and may be configured to be curved in a direction from the front surface to the rear surface of the cooking chamber 110 and to have a shape concave toward the rear surface and inserted toward the rear surface. Accordingly, a mounting space 163d which faces the front surface may be formed at the smoking agent accommodation portion coupling portion 163c, and the smoking agent accommodation portion 160 is inserted into the mounting space 163d to be mounted on the mounting portion 163. According to one embodiment, the smoking agent accommodation portion 160 may be mounted on the mounting portion 163 from the front surface toward the rear surface of the cooking chamber 110 by a sliding method.

The mounting space 163d may have a shape corresponding to an external shape of the smoking agent accommodation portion 160 to allow the smoking agent accommodation portion 160 to be seated thereon. In detail, a width w1 of the mounting space 163d is configured to correspond to a first width of the smoking agent accommodation portion 160 (refer to FIG. 6a for w3), and an insertion length w2 which extends from the front surface to the rear surface of the cooking chamber is configured to correspond to a second width w4 of the smoking agent accommodation portion. For example, when an external shape of the smoking agent accommodation portion 160 is a cylindrical shape, the width w1 and the insertion length w2 of the mounting space 163d may be the same.

According to one embodiment, the fixing portion 161, the inclined portion 162, and the mounting portion 163 of the third heater 151c may be embodied using one hot wire. According to another embodiment, only the mounting portion 163 of the third heater 151c may be embodied using a hot wire, and the fixing portion 161 and the inclined portion 162 of the third heater 151c may be embodied using a supporting member which supports the mounting portion 163 and is formed of an insulating material. In this case, a driving wire for providing power to the mounting portion 163 may be installed at the supporting member.

The third heater 151c may be independently operated from the first heater 151a or the second heater 151b and may generate heat. Accordingly, the cooking apparatus 1 may perform the smoking operation separately from the cooking operation.

The spacing member 152 may space the first heater 151a, the second heater 151b, and the third heater 151c at certain distances apart to prevent a short circuit thereamong. Also, the spacing member 152 may fix the first heater 151a, the second heater 151b, and the third heater 151c to stably locate the first heater 151a, the second heater 151b, and the third heater 151c in the cooking chamber 110. According to one embodiment, the spacing member 152 may be installed on the top surface of the internal panel 110b or the rear surface panel 110c of the cooking chamber. The spacing member 152 may include a plurality of through holes formed at certain intervals. The first heater 151a, the second heater 151b, and the third heater 151c are installed to pass through the through holes.

The coupling member 153 is configured to install the first heater 151a, the second heater 151b, and the third heater 151c on one surface, for example, the top surface of the internal panel 110b. The coupling member 153 may include a first coupling portion 153a configured to be couplable to one surface of the internal panel 110b, a second coupling portion 153b at which the first coupling portion 153a is installed and which has a bar shape, and a third coupling portion 153c which allows the first heater 151a, the second heater 151b, and the third heater 151c to be coupled to the second coupling portion 153b. The first coupling portion 153a may be installed to protrude above the cooking portion 150 and configured to have one end coupled to one surface of the internal panel 110b by a fastening member such as a screw, adhesives, and the like and have the other end attached to the second coupling portion 153b. The second coupling portion 153b, at which a plurality of such third coupling portions 153c are provided, may be embodied using an insulating material to prevent short-circuiting between the first heater 151a, the second heater 151b, and the third heater 151c. The third coupling portion 153c is configured to have a shape for holding the first heater 151a, the second heater 151b, and the third heater 151c, for example, a shape depressed in one direction as shown in FIG. 4. The first heater 151a, the second heater 151b, and the third heater 151c may be coupled to the second coupling portion 153b by the third coupling portions 153c to be stably fixed to one another.

According to an embodiment, the cooking portion 150 may further include a magnetron (not shown) which generates electric waves such that heat is generated by rotation of water molecules inside food or a steam generator (not shown) which generates a steam.

The smoking agent accommodation portion 160 accommodates a smoking agent 99 and is configured to be easily mounted on or separated from the heating portion 151. For example, the smoking agent accommodation portion 160 may be configured to be inserted in and mounted in the mounting space 163d of the third heater 151c of the heating portion 151.

Figure 6A:
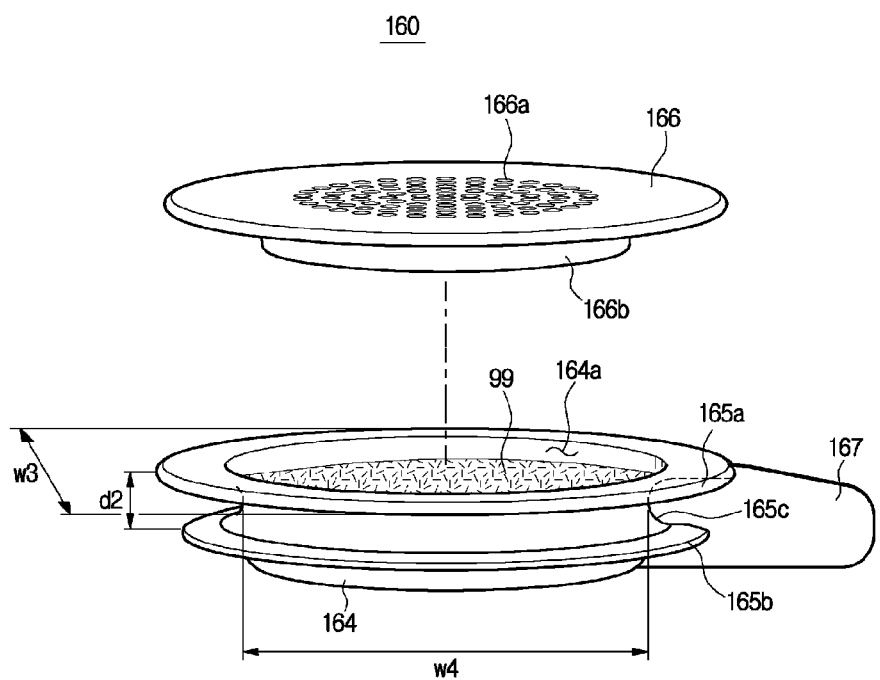
FIG. 6a is a view illustrating one embodiment of the smoking agent accommodation portion.
Figure 6B:
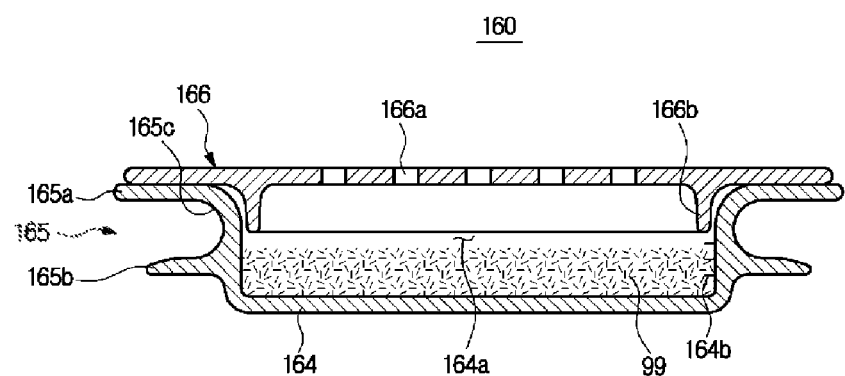
FIG. 6b is a side cross-sectional view illustrating one embodiment of the smoking agent accommodation portion.
Figure 6C:
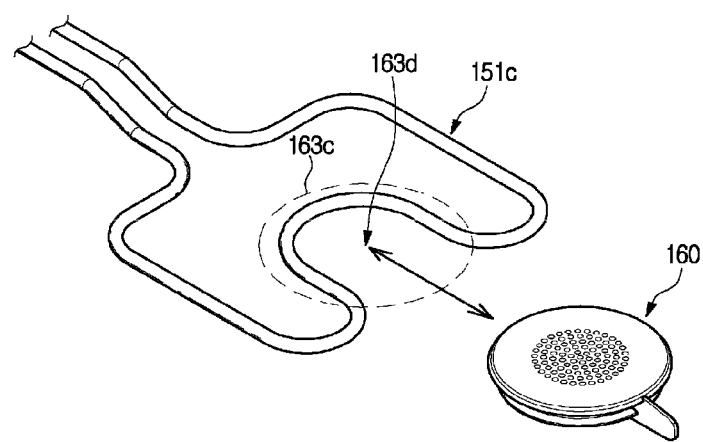
FIGS. 6C and 6D are side cross-sectional views illustrating another example of the smoking agent accommodation portion.
Figure 7:
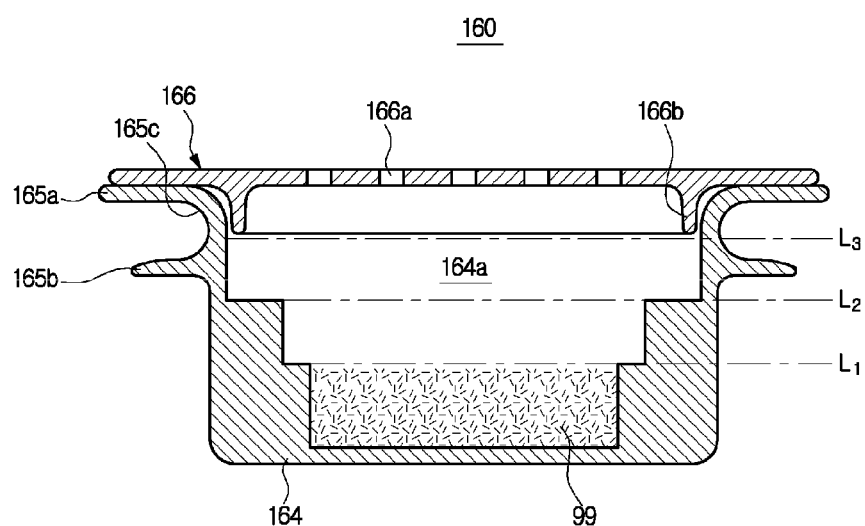
FIG. 7 is views illustrating one example in which the smoking agent accommodation portion is mounted in the third heater.

FIG. 6a is a view illustrating one embodiment of the smoking agent accommodation portion, and FIG. 6b is a side cross-sectional view illustrating one embodiment of the smoking agent accommodation portion. FIG. 6C is a side cross-sectional view illustrating another example of the smoking agent accommodation portion. FIG. 7 is views illustrating one example in which the smoking agent accommodation portion is mounted in the third heater.

As shown in FIGS. 6a and 6b, the smoking agent accommodation portion 160 may include a body portion 164 having an accommodation space 164a for accommodating a smoking agent, a heating portion coupling portion 165 formed on an outer surface of the body portion 164 and configured to be mountable on or separable from the heating portion 151, and a cover 166 which opens and closes the accommodation space 164a of the body portion 164.

The body portion 164 receives heat generated by the heating portion 151, for example, by the third heater 151c, and transmits the received heat to the accommodation space 164a to burn the smoking agent 99 accommodated therein. For this, the body portion 164 may be formed of a heat-conductive material capable of conducting heat generated by the third heater 151c. An opening may be provided at one surface of the body portion 164 to insert or withdraw the smoking agent 99. The opening of the body portion 164 may be opened and closed by the cover 166.

The smoking agent 99 means a material which is incompletely burnt by heat and generates smoke to allow a smoke flavor to be absorbed into food. The smoking agent may be embodied in a sawdust or wood chip form so as to be accommodatable in the accommodation space 164a. A variety of types of wood such as a Korean red pine, a queritron, an oak tree, a Japanese cherry, an ash tree, a walnut tree, and the like may be used in the smoking agent 99.

The heating portion coupling portion 165 may be configured to be seated on the heating portion 151 or coupled to the heating portion 151 to allow the smoking agent accommodation portion 160 to be mounted on the heating portion 151. For example, the heating portion coupling portion 165 may be configured to be mountable on or separable from the smoking agent accommodation portion coupling portion 163c of the third heater 151c.

According to one embodiment, the heating portion coupling portion 165 may include a first guide member 165a and a second guide member 165b. The first guide member 165a is formed to protrude from the outer surface of the body portion 164, and the second guide member 165b is spaced a certain distance apart from the first guide member 165a to be parallel to the first guide member 165a and is formed to protrude from the outer surface of the body portion 164. When a pair of such guide members 165a and 165b are provided as described above are seated on the smoking agent accommodation portion coupling portion 163c, the smoking agent accommodation portion 160 may be prevented from being separated from the smoking agent accommodation portion coupling portion 163c of the third heater 151c.

The first guide member 165a and the second guide member 165b are formed at the outer surface of the body portion 164 to protrude therefrom such that a seating groove 165c on which the smoking agent accommodation portion coupling portion 163c of the third heater 151c is seatable may be formed between the first guide member 165a and the second guide member 165b.

Figure 6D:
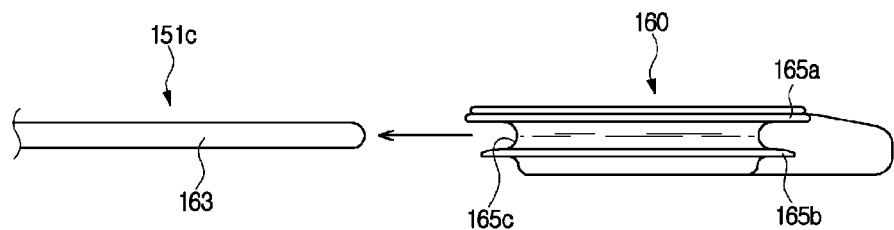

As shown in FIGS. 6c and 6d, when the seating groove 165c of the smoking agent accommodation portion 160 is located at a position of the smoking agent accommodation portion coupling portion 163c of the third heater 151c and the smoking agent accommodation portion 160 is moved toward the rear surface of the cooking chamber 110, the curved seating groove 165c of the smoking agent accommodation portion 160 slidably moves along a hot wire of the smoking agent accommodation portion coupling portion 163c which faces the rear surface and is finally seated on the smoking agent accommodation portion coupling portion 163c so as to become mounted on the mounting space 163d of the third heater 151c. Here, the smoking agent accommodation portion 160 may be guided by the first guide member 165a and the second guide member 165b so as to become mounted on the third heater 151c. Accordingly, the smoking agent accommodation portion 160 may stably come into direct contact with the heating portion 151 and be mounted thereon.

The width w3 of the body portion 164 which forms the seating groove 165c of the smoking agent accommodation portion 160 may be provided to be the same as or smaller than the width w1 of the smoking agent accommodation portion coupling portion 163c, and a longitudinal width d2 of the seating groove 165c may be provided to be the same as or greater than a thickness d3 of a hot wire which forms the smoking agent accommodation portion coupling portion 163c of the third heater 151c. Also, the length w4 of the body portion 164 may be same as or smaller than the length w2 of the smoking agent accommodation portion coupling portion 163c. Additionally, a width of the first guide member 165a which protrudes from the body portion 164 is provided to be greater than the width w1 of the smoking agent accommodation portion coupling portion 163c, and a width of the second guide member 165b may also be provided to be greater than the width w1 of the smoking agent accommodation portion coupling portion 163c.

The cover 166 may prevent the accommodated smoking agent 99 from being emitted outward by opening and closing the opening of the body portion 164. The cover 166 includes one or more discharge holes 166a to discharge smoke generated by the burning of the smoking agent 99 in the cooking chamber 110.

The cover 166 may include a contact portion 166b which is formed to protrude outward and comes into direction contact with an inner surface of the body portion 164. That is, when the cover 166 is mounted on the body portion 164, the contact portion 166b of the cover 166 is located in the accommodation space 164a of the body portion 164 while in contact with the inner surface of the body portion 164 so as to be fixed to the body portion 164.

The smoking agent accommodation portion 160 may further include a handle 167 which is formed to protrude outward from the outer surface of the body portion 164 and be gripped by a user when the smoking agent accommodation portion 160 is mounted on or separated from the heating portion 151.

As shown in FIG. 6b, the body portion 164 of the smoking agent accommodation portion 160 may further include marking members 164b formed on an inner surface which forms the accommodation space 164a and formed at positions corresponding to different accommodation amounts. When the smoking agent 99 is accommodated in the accommodation space 164a of the smoking agent accommodation portion 160, the user may easily recognize an amount of the accommodated smoking agent 99 using the marking members 164b.

According to one embodiment, as shown in FIG. 7, the body portion 164 of the smoking agent accommodation portion 160 may further include stepped portions L1, L2, and L3 formed on the inner surface which forms the accommodation space 164a. The stepped portions L1, L2, and L3 may include a plurality of steps, and the steps may be formed at positions corresponding to accommodation amounts. For example, the accommodation space 164a of the body portion 164 may include a first accommodation space formed by the first stepped portion L1, a second accommodation space formed by the second stepped portion L2, and a third accommodation space formed by the third stepped portion L3. Here, cross sections of the first accommodation space, the second accommodation space, and the third accommodation space may be the same or different. Heights of the first accommodation space, the second accommodation space, and the third accommodation space may also be the same or different. In addition, amounts of the smoking agent 99, which are accommodatable in the first accommodation space, the second accommodation space, and the third accommodation space, may be the same or different. Through this, the user may easily recognize the amount of the smoking agent accommodated in the accommodation space of the smoking agent accommodation portion 160.

Figure 8A:
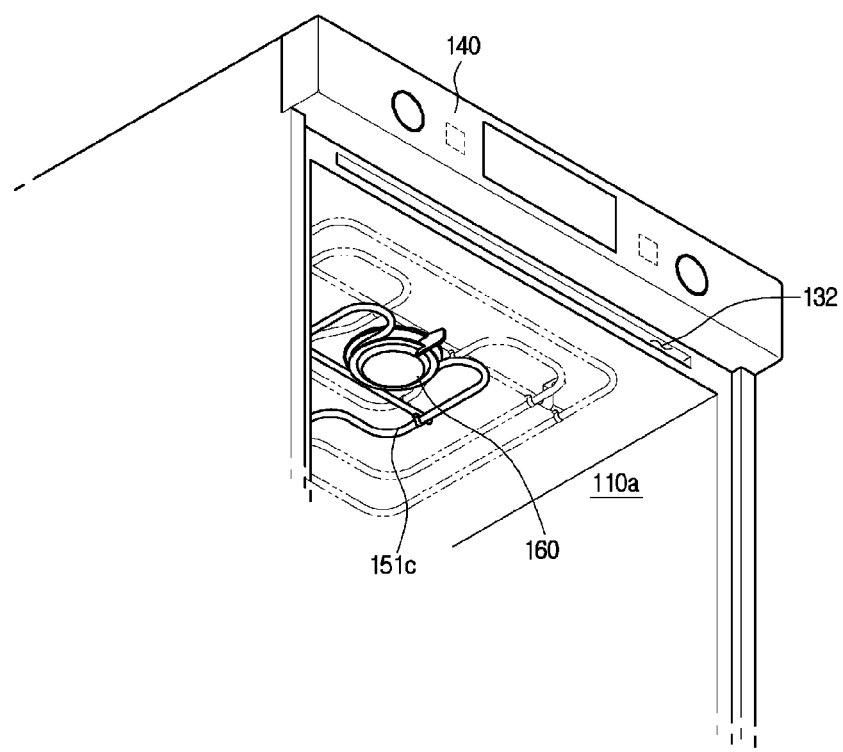
FIG. 8a is a view illustrating one example in which the smoking agent accommodation portion is coupled to the third heater.
Figure 8B:
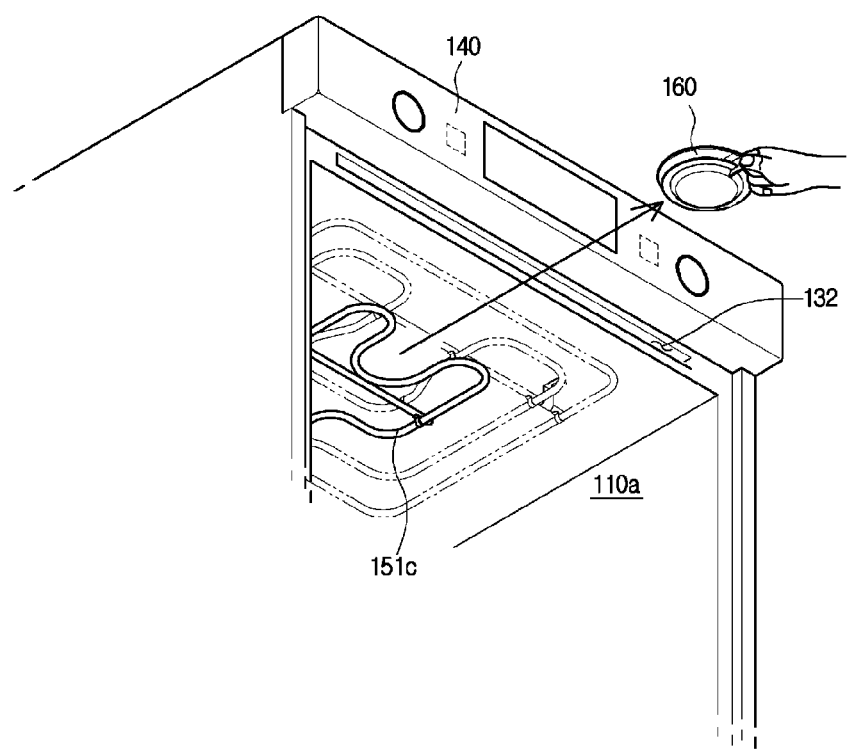
FIG. 8b is a view illustrating one example in which the smoking agent accommodation portion is separated from the third heater.

FIG. 8a is a view illustrating one example in which the smoking agent accommodation portion is coupled to the third heater, and FIG. 8b is a view illustrating one example in which the smoking agent accommodation portion is separated from the third heater.

As shown in FIG. 8a, the heating portion 151 of the cooking portion 150 may be located to be adjacent to the panel of the top surface of the cooking chamber 110 of the cooking apparatus 1 and the smoking agent accommodation portion 160 may be directly mounted on the heating portion 151. The user may grip the handle 167 of the smoking agent accommodation portion 160 before cooking and then may mount the smoking agent accommodation portion 160 on the heating portion 151 by sliding the smoking agent accommodation portion 160 to the heating portion 151 as described above. When the smoking agent accommodation portion 160 is mounted, the user closes the door 120 to isolate the cooking space 110a from the outside and begins cooking by operating the input device 141 of the user interface 140. In this case, in the heating portion 151, the third heater 151c on which the smoking agent accommodation portion 160 is mounted operates independently from the other heaters 151a and 151b such that smoke necessary for smoking may be emitted from the smoking agent accommodation portion 160 only during a certain period.

As shown in FIG. 8b, even during cooking, the user may temporarily stop cooking and may open the door 120 to separate the smoking agent accommodation portion 160 from the heating portion 151. In this case, the user may separate the smoking agent accommodation portion 160 from the heating portion 151 by gripping the handle 167 of the smoking agent accommodation portion 160 provided toward the door 120 and withdrawing the smoking agent accommodation portion 160. According to one embodiment, when the smoking agent accommodation portion 160 is separated from the heating portion 151, even when a smoking mode has already been selected, the cooking apparatus 1 may sense a separation of the smoking agent accommodation portion 160 and may automatically cancel the smoking mode. Whether the smoking agent accommodation portion 160 is separated may be sensed using an optical sensor (not shown) provided at the heating portion 151, internal panel 110b, or the rear surface panel 110c, or may be sensed using a weight sensor (not shown) provided at the heating portion 151, for example, at the third heater 151c or the coupling member 153. In addition, whether the smoking agent accommodation portion 160 is separated may be sensed using a variety of sensors.

Hereinafter, controlling of the cooking apparatus will be described with reference to FIGS. 9 to 14.

Figure 9:
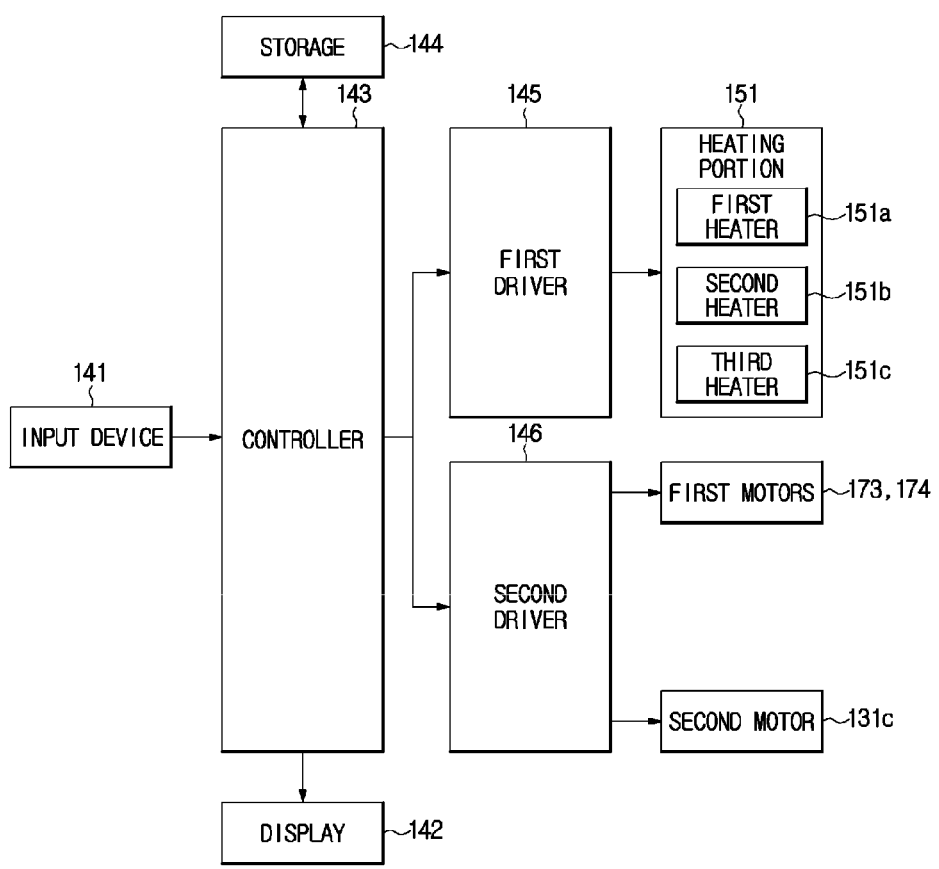
FIG. 9 is a control block diagram illustrating one example of the cooking apparatus.

FIG. 9 is a control block diagram illustrating one example of the cooking apparatus.

Referring to FIG. 9, the cooking apparatus 1 may include the input device 141, the display 142, the controller 143, a storage 144, a first driver 145, a second driver 146, and the heating portion 151.

The input device 141, the display 142, the controller 143, the storage 144, the first driver 145, the second driver 146, and the heating portion 151 may transmit and receive a control signal or data between each other using a metal circuit installed on a substrate, a cable or a wireless network. Here, the cable may include a pair cable, a coaxial cable, an optical fiber cable, or an Ethernet cable. The wireless network may be embodied using a local area communication module or a mobile communication module installed at each of the input device 141, the display 142, the controller 143, the storage 144, the first driver 145, the second driver 146, and the heating portion 151. Here, the local area communication module may use a wireless local area network (WLAN), Wi-Fi, Bluetooth, Zigbee, controller area network (CAN) communication, Wi-Fi Direct, ultra wideband communication, infrared data association (IrDA) communication, Bluetooth low energy, near field communication, and the like, and the mobile communication module may use a variety of 3GPP, 3GPP2, or Wi-Max-based mobile communication standards.

The input device 141, as described with reference to FIG. 3, may receive a variety of commands related to the operation of the cooking apparatus 1 from the user. The cooking apparatus 1 may include a plurality of input devices 141a to 141g, and the input devices 141a to 141g may generate electrical signals corresponding to operation by the user and transmit the electric signals to the controller 143.

The controller 143 may control overall operations of the cooking apparatus 1 on the basis of a command input through the input device 141. For example, the controller 143 may transmit a control signal to the display 142, the first driver 145, or the second driver 146 to control operation of the display 142, the first driver 145, or the second driver 146.

When the first input device 141a is operated and an oven mode is selected, the controller 143 may check a necessary cooking time and a target cooking temperature and may control the heating portion 151 and the first motors 173 and 174 on the basis of the checked necessary cooking time and the target cooking temperature to cook a foodstuff.

Here, the checking of the necessary cooking time and the target cooking temperature may include checking a necessary cooking time and a target cooking temperature corresponding to an amount of the foodstuff or may include checking a necessary cooking time and a target cooking temperature input to the input device 141. Here, the amount of the foodstuff may include information input through the input device 141 or information received by a communicator (not shown) which communicates with an external terminal. Also, the amount of the foodstuff may be obtained by the weight sensor provided at the cooking apparatus 1.

When the first input device 141a is operated and a grill mode is selected, the controller 143 may check a necessary cooking time and a target cooking temperature and may control the heating portion 151 on the basis of the checked necessary cooking time and the target cooking temperature to cook food.

When the first input device 141a is operated and a smoking mode is selected, the controller 143 may determine a variety of parameters related to smoking. For example, when the smoking mode is selected, the controller 143 may determine a necessary cooking time, a target cooking temperature, a smoking commencement time, and a smoking operation period. In this case, the controller 143 may determine a time at which certain period of time has passed since a cooking commencement time to be the smoking commencement time in order to commence smoking at a latter half of cooking.

For example, when the first input device 141a is operated and the smoking mode is selected, the controller 143 may check an amount of a foodstuff to be smoked, may check a necessary cooking time and a target cooking temperature corresponding to the checked amount of the foodstuff, may check a smoking operation period corresponding to the checked amount of the foodstuff, and may determine a commencement time point of the smoking operation on the basis of the checked necessary cooking time and the smoking operation period. Here, the smoking operation period may be determined by the user or may be determined according to predefined settings. When the smoking commencement time comes after cooking is commenced, the controller 143 sequentially controls the operation of the third heater 151c to heat the smoking agent accommodation portion 160 such that a smoke caused by burning the smoking agent 99 spreads around the cooking space 110a.

The controller 143 adjusts the smoking operation period on the basis of the necessary cooking time of food as described above such that a smoke generation time may be adjusted. Accordingly, a smoke flavor of the foodstuff may be maximized.

When the smoking mode is selected, the controller 143 may perform control such that all the heaters 151a to 151c of the heating portion 151 operate or may perform control such that one or more of the first heater 151a and the second heater 151b of the heating portion 151 do not operate and only the third heater 151c operates.

According to one embodiment, when the fifth input device 141e is operated while a foodstuff is cooked according to the oven mode or the grill mode, the controller 143 controls the operation of the third heater 151c from a time point at which the fifth input device 141e is operated or a time point at which a certain period of time has passed such that the smoking operation may be commenced. In this case, the controller 143 may allow the smoking operation to be performed during the smoking operation period selected by the user or according to previous settings. Here, the sixth input device 141f or the seventh input device 141g is operated, and the controller 143 may perform control such that the third heater 151c temporarily stops operating or finishes operating. According to another embodiment, when the fifth input device 141e is operated while a foodstuff is cooked according to the oven mode or the grill mode, the controller 143 may check a necessary cooking time and an elapsed cooking time, may determine a smoking operation commencement time point on the basis of the necessary cooking time, the elapsed cooking time, and a smoking operation period, and may perform control such that the third heater 151c operates from the determined time point. In this case, the controller 143 may determine the smoking operation commencement time point by further using information on an amount of the foodstuff.

For example, when a temporary stop command for cooking is input through the fourth input device 141d, the controller 143 performs control such that the operation of the heating portion 151 which includes the third heater 151c is temporarily stopped in order to temporarily stop cooking the foodstuff. When the temporary stop command is input again, the temporary stopping of the heating portion is controlled to be canceled such that the heating portion 151 is controlled to operate again. The operation of the heating portion 151 is temporarily stopped as described above such that the user may insert the smoking agent while the foodstuff is cooked.

The controller 143 may adjust temperatures of the heaters 151a to 151c by adjusting levels of currents applied to the heaters 151a to 151c of the heating portion 151 or turning on or off the operation of the heaters 151a to 151c.

For example, the controller 143 may, by controlling pulse width modulation (PWM) of the current applied to the third heater 151c, prevent a temperature of the third heater 151c from exceeding a certain temperature limit. Also, the controller 143 may, by controlling an on or off period of the operation of the third heater 151c, prevent the temperature of the third heater 151c from exceeding the certain temperature limit. Through the above-described method, the controller 143 may perform control such that a smoke occurrence amount in the cooking space 110a may be a reference occurrence amount or less. Here, the on or off operation period of the third heater 151c may be data obtained on the basis of a capacity of the third heater 151c or may be data obtained in consideration of heat generated by the other heaters 151a and 151b and the capacity of the third heater 151c. The certain temperature limit is a temperature at which harmful substances generated during a certain period of time in which the smoking agent is burnt exceeds a reference amount and may be obtained by experiment or theoretical analysis. Accordingly, the cooking apparatus 1 may prevent the occurrence of polycyclic aromatic hydrocarbon-based harmful substances such as benzopyrene caused by incomplete burning of the smoking agent 99 during the smoking operation.

According to an embodiment, the controller 143 may control the temperature of the third heater 151c on the basis of a detected temperature from a temperature detector (not shown).

Temperatures and operation times of the first to third heaters 151a to 151c under the control of the controller 143 and a detailed example of the smoking operation according thereto will be described below.

The controller 143 may be embodied using a processor formed of one or more semiconductor chips and related components built in the electronic device chamber 130.

The storage 144 may store a variety of data related to a control operation of the controller 143. The controller 143 may read data stored in the storage 144 and may generate a control signal with respect to each component of the cooking apparatus 1 on the basis of the read data.

The data stored in the storage 144 may include, for example, a type and an amount of a foodstuff such as food, a necessary cooking time and a cooking temperature corresponding to each of selectable modes, and the like. Here, the necessary cooking time and the cooking temperature may correspond to an operation time and a heating temperature of the heating portion. Also, the storage 144 may store a variety of data related to the smoking operation. The data related to the smoking operation may include, for example, information on a smoking commencement time, a temperature of the third heater 151c during smoking, and a smoking completion time point, and the like.

The storage 144 may be embodied using a magnetic disk memory device or a semiconductor memory device.

The first driver 145 may operate the heaters 151a to 151c of the heating portion 151 on the basis of a command of the controller 143. The first driver 145, on the basis of the command of the controller 143, may operate the first heater 151a and the second heater 151b of the heating portion 151 at the same time or may selectively operate the first heater 151a and the second heater 151b. In this case, the first driver 145 may adjust the intensity of heat generated by the first heater 151a and the second heater 151b by adjusting currents supplied to the first heater 151a and the second heater 151b. Also, the first driver 145 may operate the third heater 151c during the smoking mode. In this case, an amount of the supplied current is adjusted or the third heater 151c is operated according to an operation period of the third heater 151c, such that the intensity of heat generated by the third heater 151c may be adjusted.

The second driver 146 may rotate the circulating fans 171 and 172 by driving the first motors 173 and 174 on the basis of the command of the controller 143 or may rotate the cooling fan 131b by driving the second motor 131c while a foodstuff is cooked.

Hereinafter, a process in which a foodstuff is cooked by the cooking apparatus 1 and a smoking operation will be described with reference to FIGS. 10 to 15.

First, one embodiment of a method of controlling temperatures of cooking and smoking the foodstuff will be described with reference to FIGS. 10 to 11b.

Figure 10:
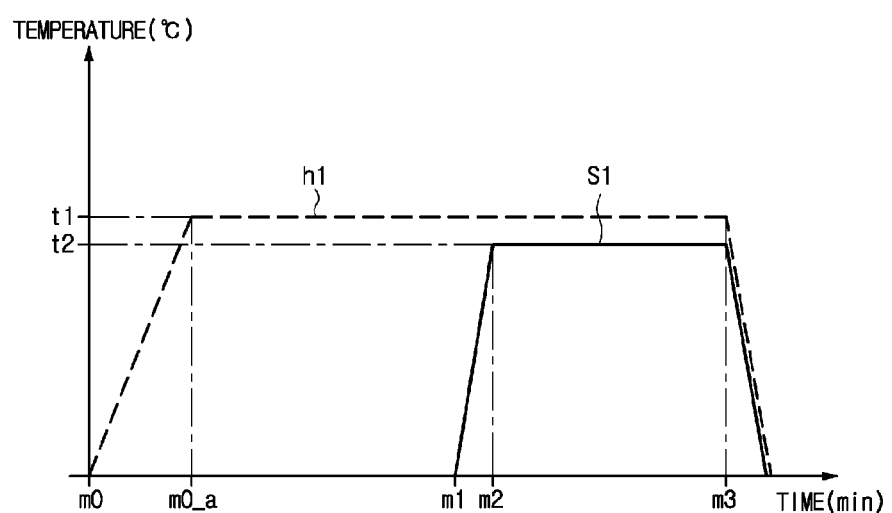
FIG. 10 is a graph illustrating one example in which a smoking agent is burnt at a relatively low temperature.
Figure 11A:
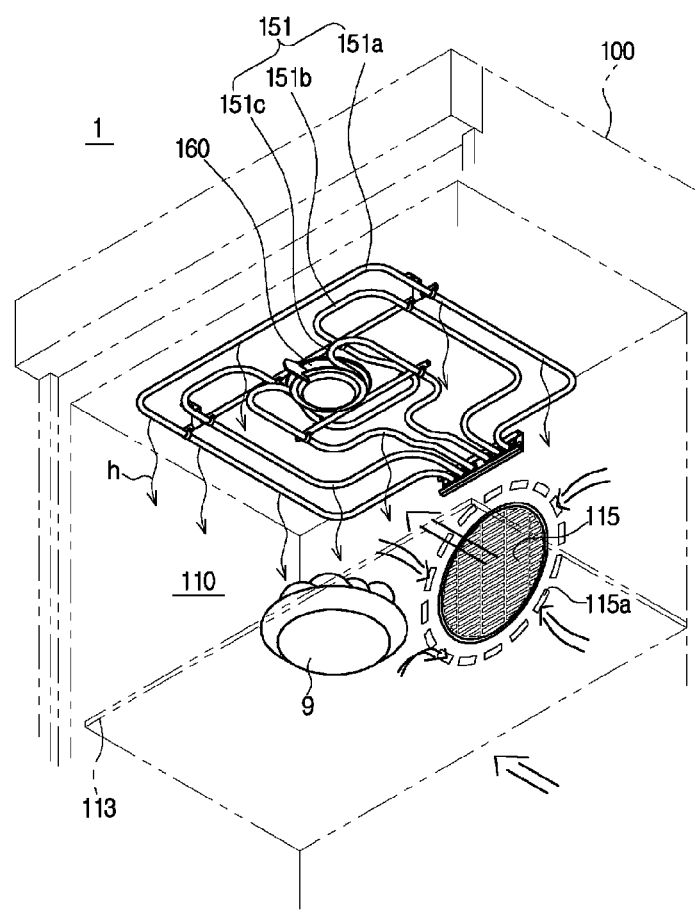
FIG. 11a is a view illustrating a heat flow during a process in which a foodstuff is cooked.
Figure 11B:
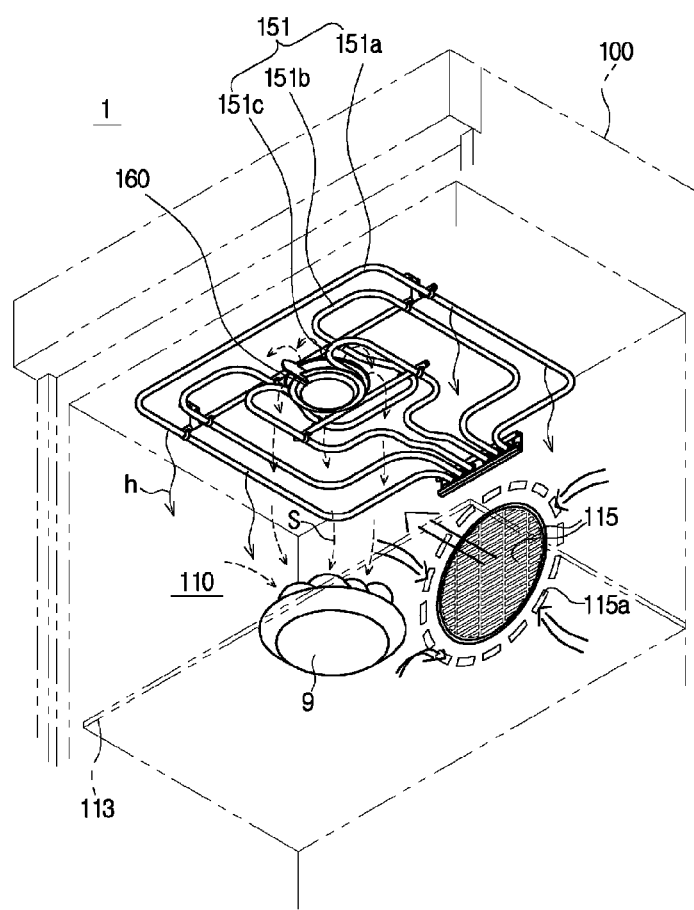
FIG. 11b is a view illustrating a smoke flow during a process in which a foodstuff is smoked.

FIG. 10 is a graph illustrating one example in which a smoking agent is burnt at a relatively low temperature, and FIG. 11a is a view illustrating a heat flow during a process in which a foodstuff is cooked. FIG. 11b is a view illustrating a smoke flow during a process in which a foodstuff is smoked. FIG. 10 is a view illustrating a cooking temperature change when a cooking time m0 to m3 is long. In FIG. 10, the x-axis refers to time and the y-axis refers to temperature. In FIG. 10, a first line h1 refers to a temperature change of the cooking space 110a in the cooking chamber 110 and a second line s1 refers to a temperature change of the third heater 151c.

The user may select an oven mode, a grill mode, or a smoking mode by operating the first input device 141a of the user interface 140 of the cooking apparatus 1. When the user selects the oven mode or the grill mode, the controller 143 of the cooking apparatus 1 may determine a cooking time and a cooking temperature according to a foodstuff and may commence cooking. When the user selects the smoking mode, the controller 143 of the cooking apparatus 1 may determine a cooking time, a cooking temperature, a smoking commencement time, a smoking completion time, and a smoking temperature according to a foodstuff and may commence cooking.

When cooking is commenced, first, a current is applied to one or more of the first heater 151a and the second heater 151b of the heating portion 151 as shown in FIGS. 10 and 11a. The one or more of the first heater 151a and the second heater 151b may generate heat h according to the applied current. The heat h emitted by the first heater 151a and the second heater 151b heats air in the cooking chamber 110 such that a temperature inside the cooking chamber 110 increases during a certain period (section between m0 and m0_a).

When the temperatures of the first heater 151a and the second heater 151b increase during the certain period (section between m0 and m0_a) and the temperature inside the cooking chamber 110 reaches a target cooking temperature t1, one or more of the first heater 151a and the second heater 151b emit heat so that the temperature inside the cooking chamber 110 may remain at the target cooking temperature t1. Accordingly, a foodstuff 9 is cooked at a certain temperature t1. In this case, the heated air may circulate in the cooking space 110a according to the operation of the first motors 173 and 174 to more effectively cook the foodstuff 9. In this case, the target cooking temperature t1 may differ according to a type or an amount of the foodstuff. For example, the target cooking temperature may be a random value between 180 to 220 degrees Celsius.

At a smoking commencement time m1, a current is applied to the third heater 151c of the heating portion 151, and the third heater 151c increases in temperature according to the applied current and generates heat (during a section between m1 and m2). Here, the smoking commencement time m1 refers to a time at which the user inputs a smoking commencement command by operating the fifth input device 141e when the user selects the oven mode or the grill mode, or refers to a smoking commencement time determined by the controller 143 when the user selects the smoking mode. The controller 143 may determine the smoking commencement time m1 so that smoking may be commenced and completed at optimal time points. The controller 143 may determine a time at which a certain period of time (m1 to m0) has elapsed since the cooking commencement time m0, and for example, may determine the smoking commencement time as m1 such that smoking may be commenced during a latter half of cooking.

When the third heater 151c reaches a target smoking temperature t2, the third heater 151c may continuously maintain the target smoking temperature t2. The heat generated by the third heater 151c is transmitted to an inside of the smoking agent accommodation portion 160, and the smoking agent 99 accommodated in the smoking agent accommodation portion 160 may begin to be burned by the transmitted heat. Accordingly, smoke is generated by the smoking agent accommodation portion 160 as shown in FIG. 11b. The generated smoke coats the foodstuff 9 disposed on the tray 113 with a smoke flavor. The smoke may circulate in the cooking space 110a according to the operation of the first motors 173 and 174 such that the foodstuff 9 is effectively coated with the smoke flavor.

Here, the target smoking temperature t2 may be set to be relatively lower than the target cooking temperature t1. In this case, the target smoking temperature t2 may be, for example, a random value between 180 to 200 degrees Celsius.

Since an amount of the smoke emitted by the smoking agent accommodation portion 160 is proportional to an amount of applied heat, when the target smoking temperature t2 is relatively low as described above, an amount of the smoke emitted by the smoking agent accommodation portion 160 may be relatively small. Accordingly, when a target smoking temperature (t4 of FIG. 12) is relatively higher, a smoking operation period m1 to m3 may be set to be relatively longer than a smoking operation period m4 to m6 to properly smoke the foodstuff. When a foodstuff having a relatively longer cooking time m0 to m3 is cooked, even when the smoking operation period (section between m1 to m3) is set to be longer as described above, smoking may be adequately performed during smoking. When the smoking operation period m1 to m3 is set to be relatively longer as described above, the foodstuff 9 may be exposed to smoke for a relatively long time such that a smoke flavor is properly added to the foodstuff 9. Even when the smoking operation period m1 to m3 is set to be relatively long as described above, since the target smoking temperature t2 is relatively low, harmful substances rarely occur or occur relatively less. Also, since the smoke generated according to the operation of the first motors 173 and 174 and since the circulating fans 171 and 172 circulate in the cooking space 110a, even when a relatively less amount of smoke occurs, it is possible to properly smoke the foodstuff.

Meanwhile, the heat emitted by the third heater 151c may heat not only the smoking agent accommodation portion 160 but also air in the cooking space 110a. Accordingly, a temperature of the cooking space 110a may be relatively higher than an intended temperature, which may cause overcooking. Accordingly, while the temperature of the third heater 151c increases (section between m1 and m2), one or more of the first heater 151a and the second heater 151b may be controlled by the controller 143 such that the temperature of the one or more of the first heater 151a and the second heater 151b may be decreased. As a result thereof, the one or more of the first heater 151a and the second heater 151b may emit heat such that the temperature of the cooking space 110a may be relatively lower than the target cooking temperature t3. Accordingly, to remain at a temperature the same or approximately same as the target cooking temperature t1, the cooking space 110a may be heated by heat of a relatively low temperature, emitted by the one or more of the first heater 151a and the second heater 151b, and by heat emitted by the third heater 151c. Here, the relatively low temperature may be empirically or theoretically determined.

According to one embodiment, a cooking operation and a smoking operation may be completed at the same time m3. In other words, completion of cooking and completion of smoking may be performed simultaneously. According to the completion of cooking and smoking, the user may obtain the smoked foodstuff.

Hereinafter, another embodiment of the method of controlling temperatures of cooking and smoking a foodstuff will be described with reference to FIG. 12.

Figure 12:
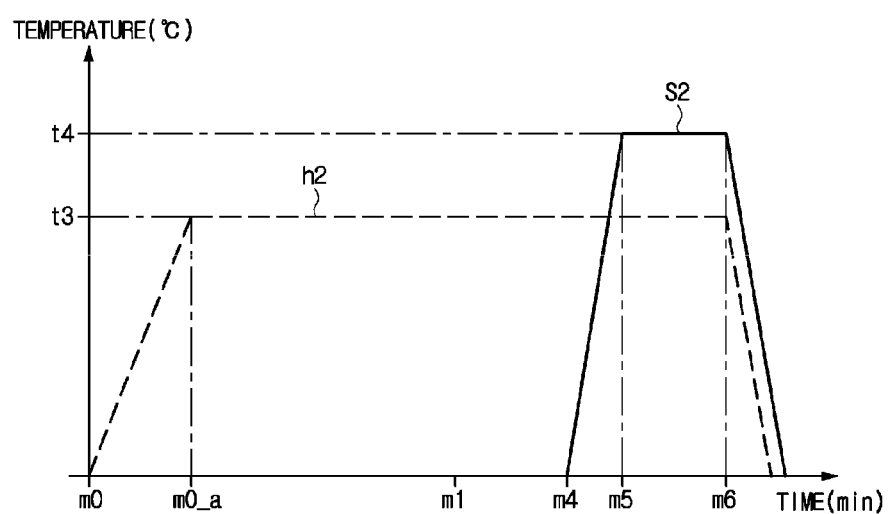
FIG. 12 is a graph illustrating one example in which the smoking agent is burnt at a relatively high temperature.

FIG. 12 is a graph illustrating one example in which the smoking agent is burnt at a relatively high temperature. FIG. 12 is a view illustrating a cooking temperature change when a cooking time m0 to m6 is relatively short. In FIG. 12, the x-axis refers to time and the y-axis refers to temperature. In FIG. 12, a third line h2 refers to a temperature change of the cooking space 110a and a fourth line s2 refers to a temperature change of the third heater 151c.

As described above, the user may select an oven mode, a grill mode, or a smoking mode by operating the first input device 141a of the user interface 140 of the cooking apparatus 1. According to the selection of the user, the controller 143 may determine a cooking time and a cooking temperature or may determine a cooking time, a cooking temperature, a smoking commencement time, a smoking completion time, and a smoking temperature and may commence cooking.

When cooking begins, a current is applied to one or more of the first heater 151a and the second heater 151b, and the one or more of the first heater 151a and the second heater 151b generate heat h according to the applied current. As shown in FIG. 12, temperatures of the first heater 151a and the second heater 151b increase during a certain period (section between m0 and m0_a) until a temperature of the cooking space 110a reaches the target cooking temperature t3 such that a temperature inside the cooking chamber 110 increases corresponding thereto. Here, the target cooking temperature t3 may differ according to a type or amount of a foodstuff, and for example, may be a random value between 180 to 220 degrees Celsius.

When the temperature of the cooking space 110a reaches the target cooking temperature t3, one or more of the first heater 151a and the second heater 151b are controlled to maintain the temperature of the cooking space 110a at the target cooking temperature t3 and emit heat.

At a smoking commencement time m4, a current is applied to the third heater 151c of the heating portion 151, and the third heater 151c increases in temperature according to the applied current and generates heat (section between m4 and m5) until the target smoking temperature t4 is reached. Here, as described above, the smoking commencement time m4 refers to a time at which the user operates the fifth input device 141e when the user selects the oven mode or the grill mode, or refers to a smoking commencement time determined by the controller 143 when the user selects the smoking mode.

When the foodstuff is cooked for a relatively short time (m0 to m6), smoking may not be performed for as long a time (section between m1 to m3) as shown in FIG. 10. In other words, the smoking operation period m4 to m6 may be relatively shorter than the smoking operation period m1 to m3 shown in FIG. 10. Accordingly, the target cooking temperature t4 may be set to be relatively higher than the target smoking temperature t2 shown in FIG. 10 for adequately smoking during a short time. In this case, the target smoking temperature t4 may be set to be higher than the target cooking temperature t3. For example, the target smoking temperature t4 may be determined to be any one value between 200 to 230 degrees Celsius. Even when the target smoking temperature t4 is higher than the target smoking temperature t2 shown in FIG. 10, since the smoking operation period m4 to m6 is shorter than the smoking operation period m1 to m3 shown in FIG. 10, an amount of harmful substances does not greatly increase.

Also, when the user inputs a smoking commencement command during a latter half of the cooking time m0 to m6, an adequate smoking operation period (section between m4 to m6) may not be provided. In this case, like in the above description, under the control of the controller 143, the target smoking temperature t4 is set to be higher to perform adequate smoking during a short time such that a large amount of smoke may be generated in a short time m4 to m6.

When the third heater 151c reaches the target smoking temperature t4, the third heater 151c may continuously maintain the target smoking temperature t4 and emit heat. Like in the above description, the heat generated by the third heater 151c is transmitted to the inside of the smoking agent accommodation portion 160, a smoke is generated by the smoking agent accommodation portion 160, and a smoke flavor is added to the foodstuff 9.

Like in the above description, the heat emitted by the third heater 151c may heat not only the smoking agent accommodation portion 160 but also air in the cooking space 110a. Accordingly, while the temperature of the third heater 151c increases (section between m4 and m5), the temperature of one or more of the first heater 151a and the second heater 151b may be controlled by the controller 143 to reduce the emitted heat. Accordingly, the temperature of the cooking space 110a may maintain the target cooking temperature t3 and accordingly may prevent overcooking.

In this case, like in the above description, the cooking operation and the smoking operation may be completed at the same time m6.

Hereinafter, still another embodiment of the method of controlling temperatures of cooking and smoking a foodstuff will be described with reference to FIG. 13.

Figure 13:
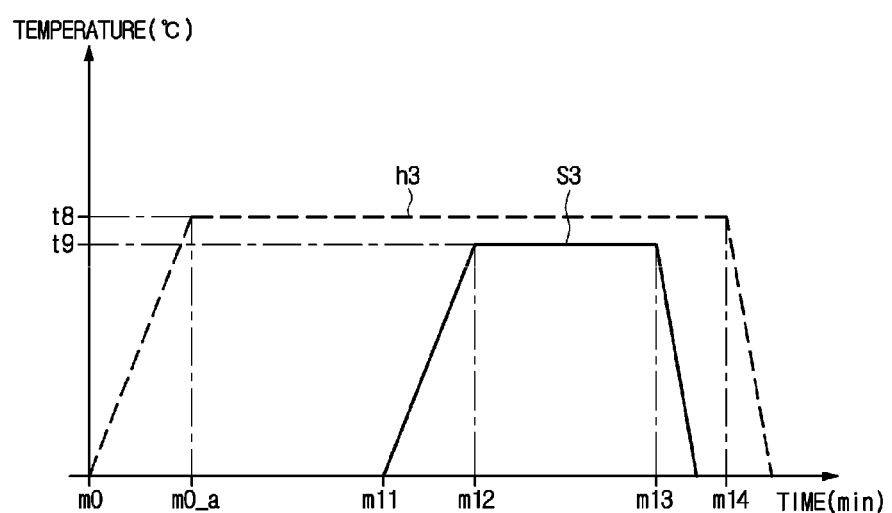
FIG. 13 is a graph illustrating another example in which the smoking agent is burned at a relatively high temperature.
Figure 14:
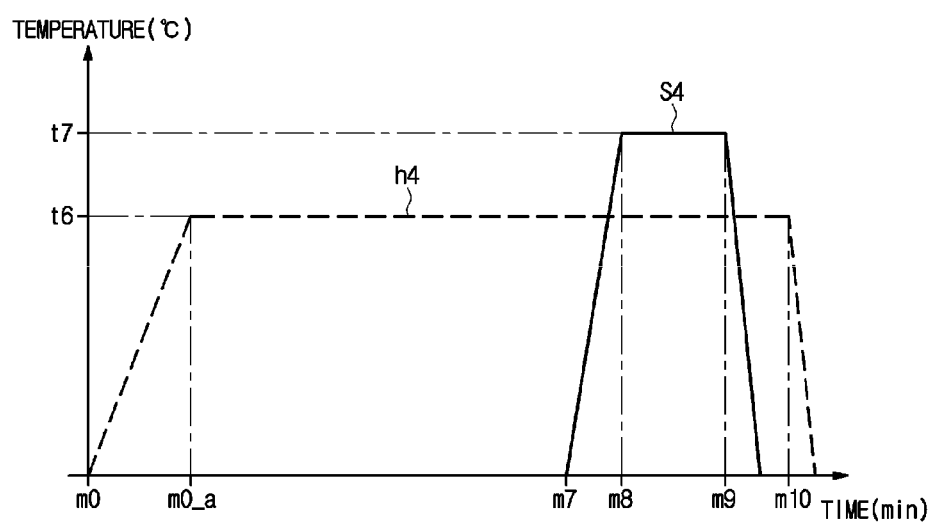
FIG. 14 is a graph illustrating another example in which the smoking agent is burned at a relatively low temperature.

FIG. 13 is a graph illustrating another example in which the smoking agent is burned at a relatively high temperature. FIG. 13 is a view illustrating a cooking temperature change when a cooking time (section between m0 to m10) is relatively short. In FIG. 14, the x-axis refers to time and the y-axis refers to temperature. In FIG. 14, a fifth graph h4 refers to a temperature change of the cooking space 110a in the cooking chamber 110 and a sixth graph s4 refers to a temperature change of the third heater 151c.

The user may select an oven mode, a grill mode, or a smoking mode by operating the first input device 141a of the user interface 140 of the cooking apparatus 1. According to the selection of the user, the controller 143 may determine a cooking time and a cooking temperature or may determine a cooking time, a cooking temperature, a smoking commencement time, a smoking completion time, and a smoking temperature and may commence cooking.

When cooking begins, a current is applied to one or more of the first heater 151a and the second heater 151b, and the one or more of the first heater 151a and the second heater 151b generate heat h according to the applied current. As shown in FIG. 13, temperatures of the first heater 151a and the second heater 151b increase during a certain period (section between m0 and m0_a) until a temperature of the cooking space 110a reaches the target cooking temperature t6. The target cooking temperature t3 may differ according to a type or amount of a foodstuff, and for example, may be a random value between 180 to 220 degrees Celsius.

When the temperature of the cooking space 110a reaches the target cooking temperature t6, one or more of the first heater 151a and the second heater 151b continuously or periodically emit heat such that the temperature of the cooking space 110a may remain at the target cooking temperature t6.

When smoking begins according to operation of the fifth input device 141e or a determination of the controller 143, a current is applied to the third heater 151c of the heating portion 151 and a temperature of the third heater 151c increases according to the applied current (section between m7 and m8) until a target smoking temperature t7 is reached.

Like the description with reference to FIG. 12, when the foodstuff is cooked for a relatively short time m0 to m10, the target smoking temperature t7 may be set to be relatively high and may also be set to be higher than the target cooking temperature t6 to adequately smoking during a short time (section between m7 to m9). In this case, the target smoking temperature t4 may be any one value between 200 to 230 degrees Celsius.

When the third heater 151c reaches the target smoking temperature t7, the third heater 151c continuously maintains the target smoking temperature t7 and emits heat, and the emitted heat is transmitted to the inside of the smoking agent accommodation portion 160 and heats the smoking agent 99 of the smoking agent accommodation portion 160. Accordingly, a smoke is generated by the smoking agent accommodation portion 160 and is transmitted to the cooking space 110a to add a smoke flavor to the foodstuff 9.

In this case, like in the above description, the temperature of one or more of the first heater 151a and the second heater 151b may be controlled by the controller 143 to reduce the emitted heat.

According to one embodiment, a cooking operation and a smoking operation may be completed at different times m9 and m10. In this case, the smoking completion time m9 may come sooner than the cooking completion time m10. In other words, smoking may be completed before cooking. Even when smoking is completed before cooking, since smoke previously generated by the smoking agent accommodation portion 160 remains in the cooking space 110a, the smoke is in continuous contact with a foodstuff. Accordingly, since the residual smoke is in contact with the foodstuff, a smoke flavor may be further added to the foodstuff. When smoking is completed before cooking as described above, since the smoking operation may be performed only during a relatively short time (section between m7 to m9), a danger in which harmful substances such as benzopyrene occur may be reduced.

Meanwhile, the user may want foodstuff to be further smoked when smoking is completed before cooking. In this case, the user may input a smoking commencement command by operating the fifth input device 141e. When the smoking commencement command is input, the third heater 151c resumes an operation under the control of the controller 143. Accordingly, a current is applied again to the third heater 151c and the third heater 151c emits heat according to the applied current. The heat emitted by the third heater 151c is supplied to the smoking agent accommodation portion 160, and accordingly the cooking apparatus 1 further smokes the foodstuff. Accordingly, the user may further perform additional smoking even when smoking is completed.

Hereinafter, yet another embodiment of the method of controlling temperatures of cooking and smoking a foodstuff will be described with reference to FIG. 14.

FIG. 14 is a graph illustrating another example in which the smoking agent is burned at a relatively low temperature. FIG. 14 is a view illustrating a cooking temperature change when a cooking time (section between m0 to m14) is relatively long, and the x-axis refers to time and the y-axis refers to temperature. In FIG. 14, a seventh line h3 refers to a temperature change of the cooking space 110a and an eight line s3 refers to a temperature change of the third heater 151c.

When any one of an oven mode, a grill mode, and a smoking mode is selected by user operation, the first input device 141a, the controller 143 determines a cooking time and a cooking temperature according to a foodstuff or determines a cooking time, a cooking temperature, a smoking commencement time, a smoking completion time, and a smoking temperature and commences cooking.

When cooking is commenced as shown in FIG. 14, a temperature of any one of the first heater 151a and the second heater 151b increases during a certain period (section between m0 and m0_a), and accordingly, a temperature inside the cooking chamber 110 increases corresponding thereto. Here, the target cooking temperature t3 may differ according to a type or amount of an foodstuff, and for example, may be a random value between 180 to 220 degrees Celsius.

When the temperatures of the first heater 151a and the second heater 151b increase during the certain period (section between m0 and m0_a) and reaches a target cooking temperature t8, one or more of the first heater 151a and the second heater 151b are controlled to remain at the target cooking temperature t8, and accordingly the temperature inside the cooking chamber 110 may also be uniformly maintained.

At a smoking commencement time m1 according to operation by the user or a determination of the controller 143, a current is applied to the third heater 151c of the heating portion 151, and the third heater 151c increases in temperature according to the applied current and generates heat (section between m11 and m12).

The third heater 151c heats the smoking agent accommodation portion 160 while maintaining a target smoking temperature t9. Accordingly, smoke is generated by the smoking agent accommodation portion 160 as shown in FIG. 11b and the foodstuff 9 is smoked by the generated smoke.

Here, the target smoking temperature t9 may be set to be relatively lower than the target cooking temperature t8. For example, the target smoking temperature t9 may be set to be a value between 180 to 200 degrees Celsius, which is relatively lower than the target cooking temperature t8. When the target smoking temperature m2 is relatively low as described above, a smoking operation period (section between m11 to m13) may be relatively longer than a case in which the target smoking temperature (t4 of FIG. 12) is relatively higher.

Meanwhile, according to one embodiment, a cooking operation and a smoking operation may be completed at different times m13 and m14. In this case, smoking may be completed before cooking. Even when smoking is completed before cooking, since smoke previously generated by the smoking agent accommodation portion 160 remains in the cooking space 110a, the smoke is in continuous contact with an foodstuff. Accordingly, since the residual smoke is in contact with the foodstuff, a larger amount of smoke flavor may be added to the foodstuff.

Meanwhile, when smoking is completed before cooking, the user may want foodstuff to be further smoked. In this case, the user may input a smoke commencement command by operating the fifth input device 141e and may further perform a smoking operation by resuming the operation of the third heater 151c such that additional smoking may be performed even during cooking.

Since the above-described cooking apparatus and method of controlling the cooking apparatus may be used in a variety of fields such as residences, industrial fields, and the like, industrial applicability is provided.

The invention claimed is:

1. A method of controlling a cooking apparatus, comprising:
   installing, into a mounting space, a smoking agent container that accommodates a smoking agent;
   operating a plurality of heaters according to predefined settings or operation by a user, wherein the plurality of heaters includes a first heater configured to provide heat to an inside of a cooking chamber and a second heater configured to provide heat to the smoking agent container, wherein the second heater defines a shape of the mounting space, wherein the shape of the mounting space is configured to accommodate an external peripheral shape of the smoking agent container, and wherein the smoking agent container is configured to mount onto the second heater within the mounting space; and
   performing a smoking function by providing, by one or more of the plurality of heaters, heat to the smoking agent container, wherein the performing of the smoking function comprises:
      in response to setting a temperature of the second heater lower than a temperature of the first heater, turning on the second heater for a first smoking operation period, and
      in response to setting the temperature of the second heater higher than the temperature of the first heater, turning on the second heater for a second smoking operation period shorter than the first smoking operation period.

2. The method of claim 1, wherein when the first heater and the second heater complete operations, the first heater and the second heater perform one or more of:
   completing, by the first heater and the second heater, operation at a same time or completing, by the first heater, operation after the second heater completes operation; and
   completing, by the second heater, operation and commencing, by the second heater, operation according to operation by the user.

3. The method of claim 1, comprising, when the first heater and the second heater operate at a same time, providing, by the first heater, an amount of heat smaller than an amount of heat provided to the inside of the cooking chamber when only the first heater operates.

4. The method of claim 1, wherein:
   the first heater commences operation according to predefined settings, and
   after a certain period of time elapses, the second heater commences operation.

5. The method of claim 1, wherein when the first heater and the second heater complete operations, the first heater and the second heater perform completing, by the first heater and the second heater, operation at a same time or completing, by the first heater, operation after the second heater completes operation.

6. The method of claim 1, wherein when a smoking commencement command is input according to operation by the user, the second heater begins providing heat to the smoking agent container.

7. The method of claim 1, further comprising mounting the smoking agent container on the second heater using a mount,
   wherein the mount comprises a smoking agent container coupler provided in front of the second heater to allow the smoking agent container to be mountable.

8. The method of claim 7, wherein the smoking agent container comprises a body portion that accommodates the smoking agent and a heater coupler formed on an outer surface of the body portion and configured to be mountable on or separable from the smoking agent container coupler.

* * * * *